US010719552B2

(12) United States Patent
Moraleda et al.

(10) Patent No.: US 10,719,552 B2
(45) Date of Patent: Jul. 21, 2020

(54) FOCALIZED SUMMARIZATIONS OF A VIDEO STREAM

(71) Applicants: Jorge Moraleda, Menlo park, CA (US); Hector H. Gonzalez-Banos, Mountain View, CA (US); Marco Antonio Covarrubias, San Jose, CA (US)

(72) Inventors: Jorge Moraleda, Menlo park, CA (US); Hector H. Gonzalez-Banos, Mountain View, CA (US); Marco Antonio Covarrubias, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 15/916,997

(22) Filed: Mar. 9, 2018

(65) Prior Publication Data
US 2018/0253491 A1     Sep. 6, 2018

Related U.S. Application Data

(63) Continuation-in-part of application No. 15/453,722, filed on Mar. 8, 2017, which is a continuation-in-part of application No. 15/447,416, filed on Mar. 2, 2017.

(51) Int. Cl.
*G06F 16/73*     (2019.01)
*G06F 16/738*    (2019.01)
(Continued)

(52) U.S. Cl.
CPC ............ *G06F 16/739* (2019.01); *G06F 16/71* (2019.01); *G06K 9/00718* (2013.01);
(Continued)

(58) Field of Classification Search
CPC ......... G06F 17/30843; G06F 17/30858; G06F 16/739; G06F 16/71; G06F 16/9566;
(Continued)

(56) References Cited

U.S. PATENT DOCUMENTS 6,496,856 B1   12/2002   Kenner et al.
8,311,277 B2   11/2012   Peleg et al.
(Continued)

FOREIGN PATENT DOCUMENTS

EP     0 932 298    7/1999
EP     3070938      9/2016
(Continued)

OTHER PUBLICATIONS

Apache, "Kafka 0.9.0 Documentation", documented on archive.org as of Nov. 20, 2015, https://web.archive.org/web/20151120080338/https://kafka.apache.org/090/documentation.html, pp. 4-5 (Year: 2015).*
(Continued)

*Primary Examiner* — Nicholas T Corbo
(74) *Attorney, Agent, or Firm* — Patent Law Works LLP

(57) ABSTRACT

The disclosure includes a system and method for creating, storing, and retrieving a focalized visualization related to a location, an event or a subject of interest. A visualization server receives a query for creating a visualization from a client device, identifies and retrieves one or more segments of a video stream satisfying the query, and generates the visualization based on the one or more segments of the video stream.

20 Claims, 18 Drawing Sheets

(51) Int. Cl.
*G06F 16/71* (2019.01)
*G06K 9/00* (2006.01)
*G06K 9/46* (2006.01)
*G06F 16/955* (2019.01)
*H04N 21/234* (2011.01)
*H04N 21/235* (2011.01)
*H04N 21/44* (2011.01)
*H04N 21/4223* (2011.01)
*H04N 21/845* (2011.01)

(52) U.S. Cl.
CPC ..... *G06K 9/00744* (2013.01); *G06K 9/00765* (2013.01); *G06K 9/00771* (2013.01); *G06K 9/46* (2013.01); *G06F 16/9566* (2019.01); *G06K 9/00295* (2013.01); *G06K 9/00751* (2013.01); *G06K 2009/00738* (2013.01); *H04N 21/2353* (2013.01); *H04N 21/23418* (2013.01); *H04N 21/4223* (2013.01); *H04N 21/44008* (2013.01); *H04N 21/8456* (2013.01)

(58) Field of Classification Search
CPC ........... G06K 9/00751; G06K 9/00718; G06K 9/00744; G06K 9/00765; G06K 9/00771; G06K 9/46; G06K 9/00295; G06K 2009/00738; H04N 21/23418; H04N 21/2353; H04N 21/4223; H04N 21/44008; H04N 21/8456
See application file for complete search history.

(56) References Cited

U.S. PATENT DOCUMENTS

| | | | |
|---|---|---|---|
| 8,949,235 B2 | 2/2015 | Peleg et al. | |
| 10,204,264 B1 | 2/2019 | Gallagher et al. | |
| 2002/0071556 A1 | 6/2002 | Moskowitz et al. | |
| 2002/0071596 A1 | 6/2002 | Estevez | |
| 2002/0172394 A1 | 11/2002 | Venkatesan et al. | |
| 2002/0178368 A1 | 11/2002 | Yin et al. | |
| 2003/0058939 A1 | 3/2003 | Lee et al. | |
| 2003/0174773 A1 | 9/2003 | Comaniciu et al. | |
| 2003/0194131 A1 | 10/2003 | Zhao et al. | |
| 2004/0098376 A1 | 5/2004 | Li et al. | |
| 2005/0240980 A1* | 10/2005 | Jun | G11B 27/105 725/135 |
| 2006/0064411 A1 | 3/2006 | Gross et al. | |
| 2007/0055695 A1 | 3/2007 | Dorai et al. | |
| 2007/0101147 A1 | 5/2007 | Brunk et al. | |
| 2007/0136656 A1 | 6/2007 | Nydam et al. | |
| 2008/0066136 A1 | 3/2008 | Dorai et al. | |
| 2008/0150431 A1 | 6/2008 | Preston | |
| 2008/0208828 A1 | 8/2008 | Boiman et al. | |
| 2010/0045799 A1 | 2/2010 | Lei et al. | |
| 2010/0082575 A1 | 4/2010 | Walker et al. | |
| 2011/0052144 A1 | 3/2011 | Abbas et al. | |
| 2011/0285748 A1 | 11/2011 | Slatter et al. | |
| 2013/0036124 A1 | 2/2013 | Ambwani et al. | |
| 2013/0156277 A1 | 6/2013 | Sasaki | |
| 2013/0290249 A1 | 10/2013 | Merriman et al. | |
| 2014/0047558 A1 | 2/2014 | Veerubhotla et al. | |
| 2014/0324864 A1 | 3/2014 | Choe et al. | |
| 2014/0188840 A1* | 7/2014 | Agarwal | G06F 17/30321 707/711 |
| 2015/0254513 A1 | 9/2015 | Mansour et al. | |
| 2015/0269231 A1 | 9/2015 | Huynh et al. | |
| 2016/0019239 A1 | 1/2016 | Bastaldo-Tsampalis et al. | |
| 2016/0071242 A1 | 3/2016 | Uralsky et al. | |
| 2016/0253576 A1 | 9/2016 | Kilpatrick | |
| 2016/0275356 A1 | 9/2016 | Kuwahara et al. | |
| 2016/0323658 A1 | 11/2016 | Richardson | |
| 2017/0339238 A1 | 11/2017 | Qin | |
| 2018/0115788 A1* | 4/2018 | Burns | H04N 19/85 |
| 2018/0376224 A1 | 12/2018 | Chun et al. | |

FOREIGN PATENT DOCUMENTS

| | | |
|---|---|---|
| JP | H10-84525 | 3/1998 |
| JP | H10-240774 | 9/1998 |
| JP | 2000056681 A | 2/2000 |
| JP | 2001024880 A | 1/2001 |
| JP | 2002-170104 | 6/2002 |
| JP | 2002-538642 | 11/2002 |
| JP | 2003-30204 | 1/2003 |
| JP | 2005-123824 | 5/2005 |
| JP | 2005346658 A | 12/2005 |
| JP | 2007-267294 | 10/2007 |
| JP | 2007-282268 | 10/2007 |
| JP | 2009-27564 | 2/2009 |
| JP | 2009-516257 | 4/2009 |
| JP | 2012199721 A | 10/2012 |
| JP | 2014-112280 | 6/2014 |
| JP | 2014-155190 | 8/2014 |
| JP | 2015-114685 | 6/2015 |

OTHER PUBLICATIONS

Atrey et al., "A Hierarchical Signature Scheme for Robust Video Authentication Using Secret Sharing," Multimedia Modelling Conference, 2004. Proceedings. 10th International. IEEE, 2004 (8 pages).

Chang et al., "Robust Image Authentication Using Content Based Compression," Multimedia systems 9, No. 2 (2003): 121-130 (10 pages).

Dittmann, et al., "Multimedia and Security," Workshop at ACM Multimedia '98, Bristol, UK, Sep. 12, 1998 (137 pages).

Lin et al., "Detection of Image Alterations Using Semi-Fragile Watermarks," Security and Watermarking of Multimedia Contents II. vol. 3971, International Society for Optics and Photonics, 2000 (12 pages).

Lin et al., "Video and image watermark synchronization." Center for Education and Research in Information Assurance and Security (2005) (238 pages).

Manaf et al., "Review of Robust Video Watermarking Methods for Copyright Protection Application," International Journal of Video &Image Processing and Network Security, vol. 16, No. 3, Jun. 2016 (8 pages).

Milano, "Content control: Digital watermarking and fingerprinting." White Paper, Rhozet, a business unit of Harmonic Inc., May 30, 2012 (11 pages).

Office Action for U.S. Appl. No. 15/447,416, dated Mar. 29, 2018, 14 pages.

Wang et al., "A Video Watermarking Scheme Based on Motion Vectors and Mode Selection," Computer Science and Software Engineering, 2008 International Conference on. vol. 5. IEEE (5 pages).

Yang et al., "Research of Digital Watermarking Algorithm Based on SVD and DWT," Applied Mechanics and Materials. vol. 65. Trans Tech Publications, 2011 (4 pages).

Bastan et al., "BilVideo-7: an MPEG-7—compatible video indexing retrieval system," dated Jul. 2010, pp. 62-73.

Extended European Search Report for EP Application No. 18156914.6, dated Apr. 4, 2018, 9 pages.

Extended European Search Report for EP Application No. 18158918.5, dated Apr. 4, 2018, 9 pages.

Pritch et al., "Clustered synopsis of surveillance video," Advanced Video and Signal Based Surveillance, Sixth IEEE International Conference on. IEEE, 2009 (6 pages).

Briefcam, Brief Cam White Paper, "White Paper: Video Synopsis Technology," 2010 (2 pages).

Schneider "What's the Difference Between Message Centric and Data Centric Middleware?" Jul. 6, 2012, Electronic Design Newsletter (5 pages).

Kreps, "The Log: What every software engineer should know about realtime data's unifying abstraction," Dec. 16, 2013, URI: https://engineering. linkedin. com/distributed-systems/log-what-every-software-engineer-should-knowabout-real-time-datas-unifying (29 pages).

(56) References Cited

OTHER PUBLICATIONS

Author Unknown "Apache Kafka is a Distributed Streaming Planform. What Exacly Does that Mean?" printed on Jul. 13, 2017, retrieved at https://kafka.apache.org/intro (2 pages).
Bligh, Alex, "What is Distributed Storage and Why Use It," Flexiant, Jul. 26, 2013, retrieved on Jun. 14, 2018 from http://www.flexiant.com, 4 pages.
Office Action for JP Application No. 2018-032691, dated Feb. 19, 2019, 10 pgs. (with translation).
Office Action for JP Application No. 2018-036253, dated Feb. 26, 2019, 7 pgs. (with translation).
Author Unknown, "Apache Kafka is a Distributed Streaming Platform. What Exactly Does that Mean?" retrieved from https://kafka.apache.org/intro on Jul. 13, 2017, 2 pgs.
Rigoni et al., "Detecting tampering in audio-visual content using QIM watermarking," Information Sciences 328, 2016, pp. 127-143.
Lin, "Watermarking and Digital Signature Techniques for Multimedia Authentication and Coypright Protection," internet citation, Jan. 1, 2000, retrieved from http://citeseerx.ist.psu.edu/viewdoc/summary?doi=10.1.1.32.5211, pp. 1-258.
Office Action for JP Application No. 2019-029024, dated Feb. 20, 2020, 10 pgs. (with translation).

\* cited by examiner

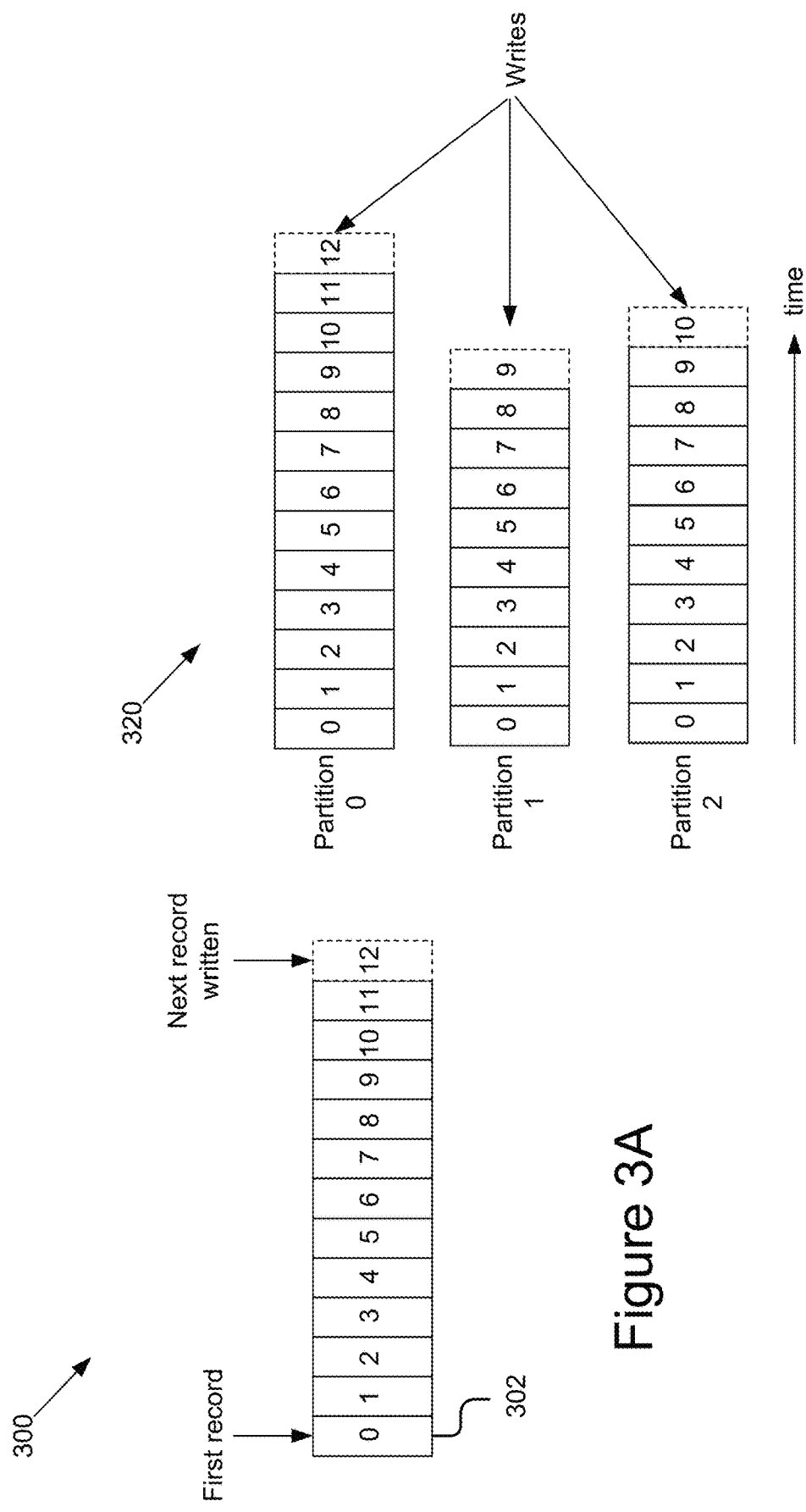

FOCALIZED SUMMARIZATIONS OF A VIDEO STREAM

CROSS REFERENCE TO RELATED APPLICATIONS

This application is a continuation-in-part of U.S. application Ser. No. 15/453,722, filed Mar. 8, 2017 and entitled "Subsumption Architecture for Processing Fragments of a Video Stream," which is a continuation-in-part of U.S. application Ser. No. 15/447,416, filed Mar. 2, 2017 and entitled "Decomposition of a Video Stream into Salient Fragments," both of which are incorporated herein by reference in their entirety.

BACKGROUND

1. Field of the Invention

The specification generally relates to processing a video stream. In particular, the specification relates to a system and method for creating, storing, and retrieving a focalized visualization related to a location, an event, or a subject of interest.

2. Description of the Background Art

Historically, video surveillance has been performed using cameras to transmit a video signal to a limited set of monitors based on switching video signals (e.g., closed-circuit television systems). With the transition to the digital era video management systems or digital video recorders distribute video streams and provide video analytics, but the video surveillance paradigm remains the same. The video analytics may be, for example, the capability of automatically analyzing video to detect and determine temporal and spatial events. However, the predominant paradigm to distribute video streams remains connection-centric and it is mainly concerned with routing video from cameras to storage and displays. As a result, the video analytics provided by the industry now follows a monolithic architecture.

The current video analytics architecture is monolithic because functionally distinguishable analytics tasks (e.g., data input and output, data processing, error handling, and the user interface) are interwoven and not separable into sub-tasks. One way to get a less monolithic architecture is edge analytics, which allows one or more analytics to be performed at the camera side or close to the camera. Edge analytics may be a form of distributed analytics, but this property on its own does not guarantee a separable design. Another solution might be a distributed system. The distributed system may be distributed in the sense that system components are located on networked computers and can communicate with each other to perform functionality; however, the distributed system can nevertheless be monolithic because it is difficult to scale with increasing number of components or rising task complexity. For example, the traditional telephone exchange system was a distributed system that was hard to expand and maintain.

Current video management systems suffer from some other issues. For example, typical surveillance systems only contain a core analyzer whether on premise or in the cloud. In addition, current surveillance products favor a certain system deployment, i.e., enterprise-like systems where many vendors sell servers, switches, and storage to handle many cameras deployed within a same LAN or Intranet. As a result, video analytics using these surveillance products merely scale with the number of video streams within a site. More importantly, the prevailing paradigm emphasizes surveillance deployments of "few locations with many cameras" whereas deployments of "many of locations with few cameras" are underserved.

In addition to the issues discussed above, the current video management systems also lack an efficient way to detect an event-of-interest and produce a video summarization as-needed that accurately reflects a scenario of the event.

SUMMARY

The techniques introduced herein overcome the deficiencies and limitations of the prior art, at least in part, with a system and method for creating, storing, and retrieving a focalized visualization related to a location, an event or a subject of interest. In one embodiment, the system includes one or more processors and a memory storing instructions, which when executed cause the one or more processors to create a visualization from a client device, identify and retrieve one or more segments of a video stream satisfying the query, and generate the visualization based on the one or more segments of the video stream.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 3A and 3B depict graphical representations of example commit logs.

DETAILED DESCRIPTION

Figure 1:
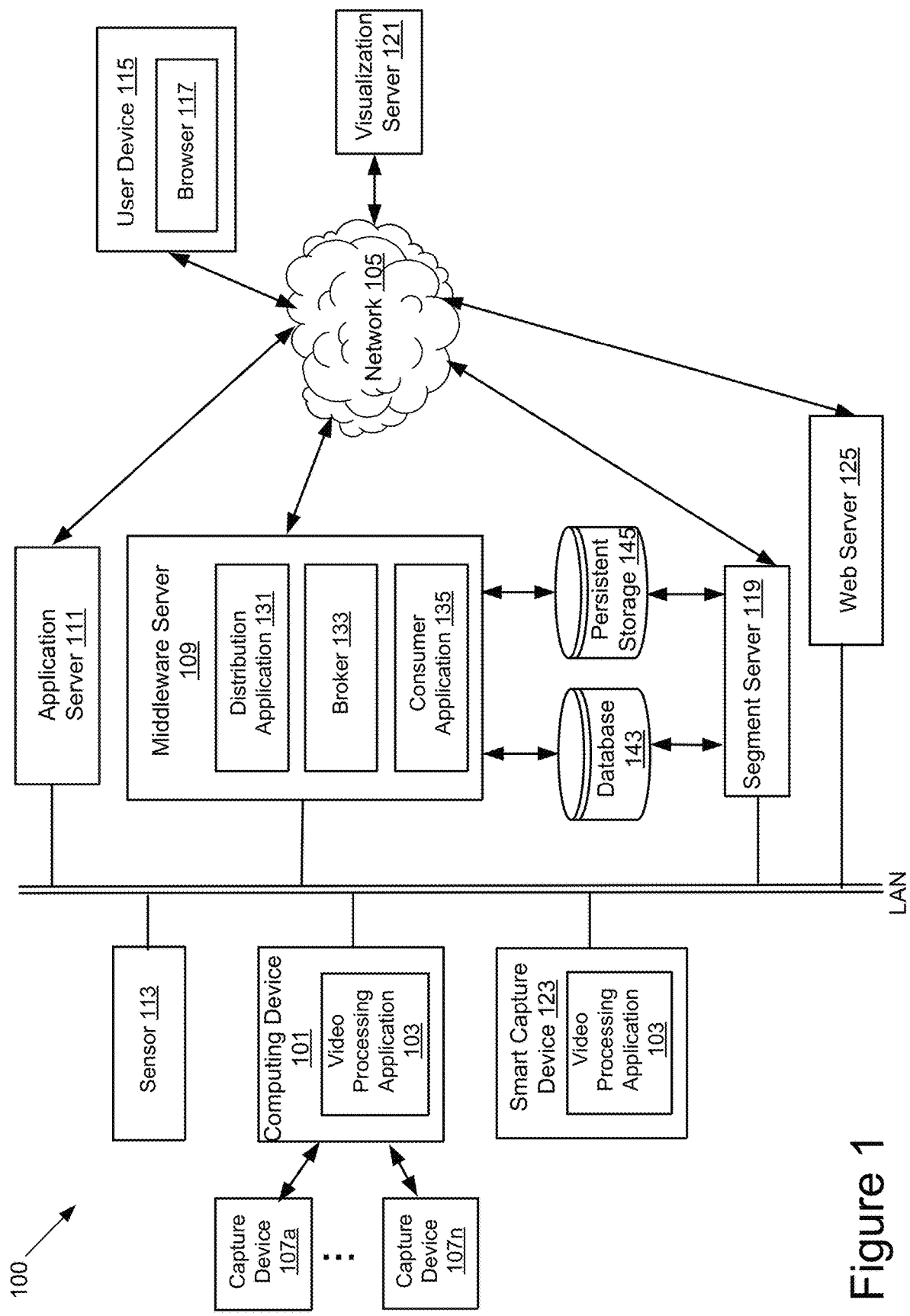
FIG. 1 depicts a high-level block diagram illustrating one embodiment of a system for creating, storing, and retrieving a focalized visualization related to a location, an event or a subject of interest.

FIG. 1 depicts a high-level block diagram illustrating one embodiment of a system 100 for creating, storing, and retrieving a focalized visualization related to a location, an event or a subject of interest. The illustrated system 100 includes a computing device 101, capture devices 107a . . . 107n, a smart capture device 123, a sensor 113, a middleware server 109, an application server 111, a segment server 119, a user device 115, a visualization server 121, a web server 125, a database 143, and a persistent storage 145. In the illustrated embodiment, the computing device 101, the capture devices 107a . . . 107n, the smart capture device 123, the sensor 113, the middleware server 109, the application server 111, the segment server 119, and the web server 125 are connected in a local area network (LAN) and are further communicatively coupled to other entities of the system 100 via a network 105. In other embodiments, the database 143 and/or the persistent storage 145 may be located remotely and coupled to other entities of the system 100 via the network 105.

Although definite numbers of capture devices, sensors, computing devices, smart capture devices, user devices, application servers, middleware servers, segment servers, web servers, visualization servers, databases, and persistent storages are shown in FIG. 1, it should be understood that there may be any number of such entities. Also, such entities can be connected by any number of networks and/or LANs. Further, in FIG. 1 and the remaining figures, a letter after a reference number, e.g., "107a," represents a reference to the element having that particular reference number. A reference number in the text without a following letter, e.g., "107," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The user device 115 is a computing device including a processor, a memory, applications, a database, and network communication capabilities. For example, the user device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the application server 111, the visualization server 121, the middleware server 109, the segment server 119, the capture device 107, the smart capture device 123, the sensor 113, or the computing device 101. In some embodiments, the user device 115 communicates with other entities of system 100 via the network 105 for providing functionality described herein. For example, when a user enters a security checking point, an application of the user device 115 associated with the user is triggered to send a request for a visualization. In response to the request, the segment server 119 identifies video content related to the security checking point and transmits the video content to the visualization server 121 to create the visualization focalized on the event of the user entering the security checking point. The user device 115 accesses the visualization through a URL assigned by the visualization server 121. Further, the user device 115 presents the visualization to the user and receives user input regarding the visualization from the user.

In some embodiments, the user device 115 includes a browser 117. The browser 117 is an application running on the user device 115 that locates, retrieves, and displays content for a user accessing the user device 115. For example, the browser 117 may communicate with the visualization server 121 to pull the video content using HTTP GET requests from the visualization server 121 for displaying to a user in response to the user's video content request.

The visualization server 121 may be either a hardware server, a software server, or a combination of software and hardware. The visualization server 121 may be, or may be implemented by, a computing device including a processor, a memory, applications, a database, and network communication capabilities. The visualization server 121 communicates with other entities of the system 100 via the network 105 to perform the functionality described herein. In some embodiments, the visualization server 121 communicates with the web server 125 to identify and retrieve video content related to an external trigger (e.g., an event) from the segment server 119, and assembles the identified video content to generate a visualization focalized on the trigger event. In some embodiments, the visualization server 121 converts the formats of the video content and provides the converted video content to a user. For example, the visualization server 121 may be a dynamic adaptive streaming over HTTP (DASH) server or a HTTP live streaming (HLS) server. The visualization server 121 reads video segments from one or more commit log and prepares the video content or visualization for adaptive bitrate streaming according to MPEG-DASH (DASH) or HLS standards. In some embodiments, the visualization server 121 makes the visualization accessible for a user accessing the user device 115 through a URL. The commit log of video segments is described below with reference to FIGS. 3A-3D.

In the illustrated embodiment, the computing device 101, the capture device 107, the smart capture device 123, the sensor 113, the application server 111, the middleware server 109, the segment server 119, the web server 125, the database 143, and the persistent storage 145 communicate with each other in a LAN. In other embodiments, these entities may be connected by multiple LANs (not shown). The computing device 101, the capture device 107, the smart capture device 123, the sensor 113, the application server 111, the middleware server 109, the segment server 119, and the web server 125 located on the same LAN or different LANs are also communicatively coupled to the visualization server 121 and the user device 115 via the network 105.

The capture device 107 is a hardware device that captures video and associates metadata with the video. For example, the capture device 107 can be a digital video camera, a web cam, an IP camera, etc. The video captured by the capture device 107 can be any series of time-related images. The capture device 107 associates metadata with the video, for example, a time and a location at which the video was captured, an image size, an image resolution, color depth, a frame rate, etc.

The smart capture device 123 is a capture device similar to capture device 107 that is also capable of invoking applications, running software programs, or performing other analytics logic. For example, a smart capture device 123 may run a video processing application to perform image recognition on the captured video. In some embodiments, the smart capture device 123 performs the video processing functions of the computing device 101 running video processing application 103, described below.

The sensor 113 is a hardware device that detects and responds to input from a physical environment. The sensor 113 is coupled to the LAN and/or the network 105 to provide information or signals about the physical environment. Although it is not shown in FIG. 1, as described above, a single sensor, a series of sensors, or a grid or array of sensors may be located in different LANs and coupled to the network 105. The sensor(s) can be a beacon for detecting the location and orientation of a user. For example, the sensor(s) may be a global positioning system sensor, a Wi-Fi sensor, a micro electro mechanical system sensor, a Bluetooth beacon such as a Bluetooth low-energy beacon, an ultrasonic beacon, a depth sensor, a video camera, a sensor using cellular positioning, near field communications, video location, and other positioning techniques. Other types of sensors may include, but not limited to, a motion sensor such as a gyroscope, a proximity sensor, a radio frequency detector, an accelerometer, an ambient light sensor, a thermal sensor, a biometric sensor, etc.

The computing device 101 is a hardware device/server that performs video analytics on a video stream. In some embodiments, the computing device 101 connects with the capture device 107 to receive a video stream for performing video analytics. In some embodiments, the computing device 101 connects to a single capture device or connects multiple capture devices. The computing device 101 receives an input video stream from the attached capture device 107, and generates output video content, e.g., selected video segments as described below, based on processing the input video stream.

In some embodiments, the computing device 101 is capable of invoking applications and running software programs to perform video analytics on content management, deployment management, etc. For example, the computing device 101 may use an application to manage the video content based on identification, correlations, aggregations, filtering, and sampling, etc. The computing device 101 may identify features from the video stream, recognize objects from the video stream based on the features, and select portions of the video stream to generate rich video content. The computing device 101 may also run an enhancer program to improve the quality of the video stream.

In some embodiments, the computing device 101 and/or a smart capture device 123 include a video processing application 103. In some embodiments, the video processing application 103 can be implemented using programmable or specialized hardware. In some embodiments, the video processing application 103 can be implemented using a combination of hardware and software. In other embodiments, the video processing application 103 may be software stored and executed on the computing device 101 and/or smart capture device 123.

In some embodiments, the video processing application 103 receives a video from a capture device and decomposes the video into fragments. In some embodiments, the video processing application 103 determines saliency of objects based on at least one of motion detection, contrast, color, and semantic properties, and decomposes a video into fragments based on the saliency. A salient fragment of the video is a subset of frames of the video and a subset of pixels from the subset of frames. For example, pixels corresponding to an object in the video may be found in multiple frames of the video. These frames with the pixels corresponding to an object may be extracted from the video as a subset of frames. Further, the pixels corresponding to the object (and in some embodiments, some pixels surrounding the object) are extracted from each of the subset of frames. The resulting subset of frames including only the pixels associated with the object are a salient fragment.

The video processing application 103 breaks the salient fragments to segments of short duration (e.g., one second, three second) and associates the segments with metadata. The segment metadata includes at least one of a start time of a segment, a time duration of the segment, a number of frames included in the segment, an index of key frames, a frame width, a frame height, a camera identifier, a location of the camera, a site description and a camera configuration used to capture the segment, etc. In some embodiments, the segment metadata also includes relationship information between segments such as a spatio-temporal relationship or a cause-and-effect relationship. In other embodiments, the segment metadata further includes saliency attributes such as a motion saliency attribute, the presence of objects or people in the segment, etc. The video processing application 103 transmits the segments and associated metadata to the middleware server 109 for further processing.

The middleware server 109 is a hardware device/server that performs additional video analytics on video segments of a video stream. The middleware server 109 manages middleware for data centric communication that mediates the rules for the structure, access to, and modification of data. In some embodiments, the data-centric middleware includes, but is not limited to, Real-Time Innovations (RTI) data distribution service (DDS), Open Splice DDS, Amazon Kinesis, Apache Kafka, etc. For example, the middleware server 109 may use Apache Kafka as the data distribution platform to generate video data, process the video data sequentially and incrementally record-by-record or over sliding time windows, and perform a wide variety of analytics (e.g., correlations, aggregations, filtering, sampling, etc.) on the video data.

In some embodiments, the middleware server 109 includes a distribution application 131, a broker 133, and a consumer application 135, which can be implemented using software stored and executed on the middleware server 109, using programmable or specialized hardware, or using a combination of hardware and software.

The distribution application 131 groups salient fragments/segments into topics. A topic is a category to which records (e.g., video content) are published. The distribution application 131 may associate an exclusive topic with a single video fragment/segment, assign a video fragment/segment to multiple topics, assign different video fragments/segments to a single topic, or associate a single continuous fragment/segment of an entire video stream with a singleton topic.

The distribution application 131 assigns the distribution of the video segments to brokers and/or servers based on sharding the segments by topic. In some embodiments, the video processing application 103 may shard the topics themselves and distribute the sharded topics and segments to separate brokers and/or servers. For example, the distribution application 131 splits a topic into partitions, and assigns each partition of the topic to a different broker.

The distribution application 131 also publishes the segments into corresponding topics. In some embodiments, the distribution application 131 associates each partition of a topic with a commit log and writes each record of the commit log with a sequence of video segments. In some embodiments, the commit log is an append-only, ordered sequence of records. The distribution application 131 appends records to the end of the commit log and assigns each entry of the records a unique sequential entry number or timestamp.

The broker 133 manages a commit log, for example, updates the records and metadata associated with one or more commit logs. In some embodiments, the broker 133 also communicates with the video processing application 103, the distribution application 131, the consumer application 135, and other components of the system 100 to retrieve data from the log and provide the data to a user. In some embodiments, a number of brokers is driven by the number of middleware servers managing the middleware, typically one broker per device. Although there are only one middleware server and one broker depicted in FIG. 1, one skilled in the art would recognize any number of middleware server and brokers can be included in the system 100.

The consumer application 135 configures more than one process running parallel in different devices such that multiple video segments can be processed at same time. For example, the consumer application 135 configures an indexer to run as a Kafka consumer group subscribed to a topic containing the video segments such that every segment is read by one and only one indexer instance, and the indexing operation is spread among multiple processes to increase the throughput of the system 100. In some embodiments, the indexer archives segments associated with a video stream in persistent storage and adds a record into a database for each segment processed. In some embodiments, the record of a segment includes a universal identifier (UUID) assigned to the segment, the location at which the segment is stored, and metadata associated with the segment. In other embodiments, the consumer application 135 also configures one or more saliency analyzers to analyze segments of a video stream to determine the occurrence of a salient event. A saliency analyzer can be a motion analyzer, a face detection analyzer, etc. One saliency analyzer may be triggered by the assertion of another saliency analyzer. For example, a face detection analyzer will operate only on the segments for which a motion analyzer reports motion. Activating a saliency analyzer when needed or on-demand reduces computation and network resource costs.

The application server 111 may be either a hardware server, a software server, or a combination of software and hardware. The application server 111 may be, or may be implemented by, a computing device including a processor, a memory, applications, a database, and network communication capabilities. In some embodiments, the application server 111 receives an external trigger and convers it to a query for a visualization. For example, when a locker is opened, the application server 111 receives this trigger event and generates a query for requesting the video content capturing the surrounding of the locker at the time the lock was opened. The application server 111 also communicates with the web server 125, the segment server 119, and the visualization server 121 to return the requested video content/visualization in response to the query. The application server 111 is described below with reference to FIGS. 6, 7A, 7B, and 12.

The segment server 119 may be either a hardware server, a software server, or a combination of software and hardware. The segment server 119 may be, or may be implemented by, a computing device including a processor, a memory, applications, a database, and network communication capabilities. In some embodiments, the segment server 119 communicates with application server 111, the web server 125 and the visualization server 121 to return a list of segments satisfying a given set of restrictions specified in a query. In other embodiments, the segment server 119 also returns the content or metadata of the specified segment. In some other embodiments, the segment server 119 further offers discovery functionality to notify a client device of a metadata attribute that can be queried and a valid range of the metadata attribute. The segment server 119 is described below with reference to FIGS. 5A-5C and 9.

The web server 125 may be either a hardware server, a software server, or a combination of software and hardware. The web server 125 may be, or may be implemented by, a computing device including a processor, a memory, applications, a database, and network communication capabilities. For example, the web server 125 is an Apache HTTP server or a Nginx server. In some embodiments, the web server 125 handles a user request (e.g., a HTTP request) from a client device (e.g., a user device 115, a capture device 107, a smart capture device 123), and provides caching and load balancing functions. The web server 125 is described below with reference to FIGS. 5A-5C.

The techniques described herein allows an external system to submit queries based on events or objects deemed of interest by a third party. The visualization thus produced is focalized on the event or object of interest. For example, for a visualization system focalized on smart lockers, a visualization is created whenever a lock is opened or tampered based on the video captured by the cameras surrounding the locker during the time of the occurrence. Based on the smart locker placement, the time when the lock was opened and how it was opened, a visualization request specifying the appropriate cameras, starting time and duration of the visualization is created, and in response, video segments relevant to this trigger event is identified and retrieved for assembling the visualization. Creating a visualization when requested prevents computing devices, storage, sensors from being active and running all the time, and thus saves computation and resource cost. In addition, there is no data transmission until a visualization is requested, which minimizes the network traffic and increases the network throughput.

The techniques described herein further uses a data-centric distributed approach for video analytics that allows easy implementation of comprehensive analytics tasks, which improves the existing paradigm by achieving: (1) data integration—data is easily available to different storage and processing systems; (2) real-time data processing—data streams can be derived from the analysis of other streams; and (3) distributed design—simplified design of complex video analytics. The techniques described herein therefore are advantageous in many aspects. First, the data-centric distributed approach clearly distinguishes the analytic tasks into sub-tasks (i.e., tasks are divided into simpler sub-tasks), and thus is no longer monolithic. Second, it is easy to scale a data-centric architecture by increasing the number of components or increasing task complexity. Third, the data-centric distributed approach allows different deployments, in particular, the deployments of "many locations with few cameras." In addition, with this data-centric distributed approach, more complex video analytics can be performed with reduced computer and network resources. For example, the indexer is configured as a Kafka consumer group subscribed to a topic containing video segments such that different indexer instances handle different segments in parallel, and thus increases the system throughput.

Figure 2A:
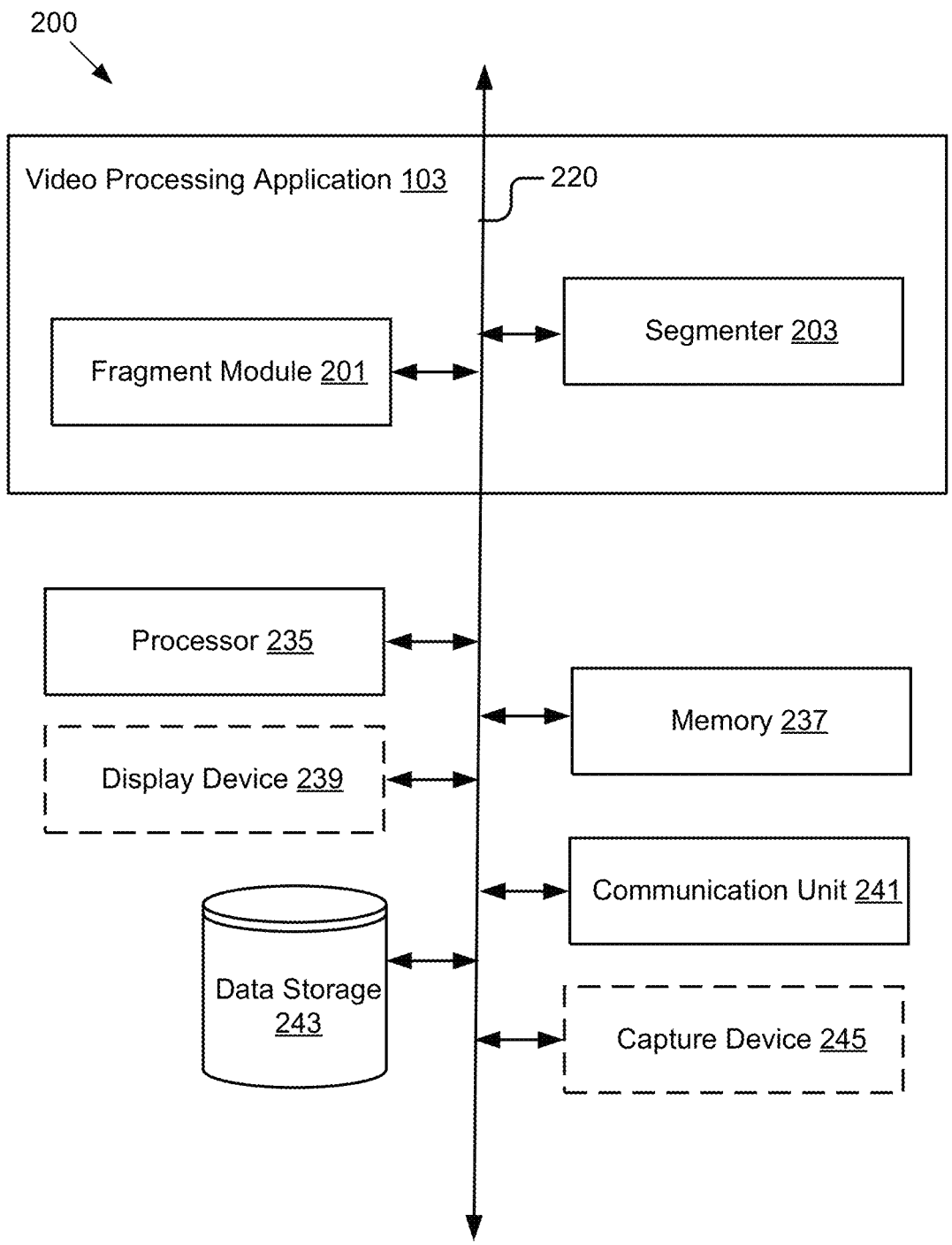
FIG. 2A depicts a block diagram illustrating one embodiment of a connect box including a video processing application.

FIG. 2A depicts a block diagram illustrating one embodiment of a system 200 (e.g., computing device 101 or smart capture device 123) including a video processing application 103. The system 200 may also include a processor 235, a memory 237, an optional display device 239 and capture device 245, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual and may include a single processing unit or a plurality of processing units and/or cores. In some implementations, the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 237 via the bus 220 to access data and instructions therefrom and store data therein. The bus 220 may couple the processor 235 to the other components of the system 200 including, for example, the memory 237, the communication unit 241, the video processing application 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one embodiment, the memory 237 may store the video processing application 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2A with dashed lines to indicate it is optional. For example, the system 200 may be a server for performing video content analysis without a display device 239 or a smart capture device without a display.

The communication unit 241 is hardware for receiving and transmitting data by linking the processor 235 to the network 105 and other processing systems. The communication unit 241 receives data for processing. For example, the communication unit receives video data from the capture device 107 for processing by the video processing application 103. The communication unit 241 may also transmit information to a user device 115 for display. For example, the communication unit 241 receives a request for video content from a user of the user device 115 and transmits the video content to the user device 115 via the visualization server 121. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the user device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220 to receive data for storage and provide data for retrieval upon a request for the data. The data storage 243 may store a video, fragments of the video, topics associated with the fragments, a distributed commit log, etc.

The capture device 245 is a hardware device that captures video and associates metadata with the video. For example, the capture device 245 can be a digital video camera, a web cam, an IP camera, etc. The video captured by the capture device 245 can be any series of time-related images. The capture device 245 associates metadata with the video, for example, a time and a location at which the video was captured, an image size, an image resolution, color depth, a frame rate, etc. The capture device 245 is coupled to the bus 220 for communication with the processor 235 and the other components of the system 200. It should be noted that the capture device 245 is shown in FIG. 2A with dashed lines to indicate it is optional. For example, the system 200 may be a server for performing video content analysis connected to a remote capture device 107 or a smart capture device 123 that includes an integrated capture device 245.

In some embodiments, the video processing application 103 includes a fragment module 201 and a segmenter 203.

The components of the video processing application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The fragment module 201 may include software and/or logic to provide the functionality for decomposing a video into fragments. The video can be any series of time-related images. A fragment or fragment sequence is a subset of the video that includes multiple time-related images or frames of the video. Each frame of the fragment at a time instant includes a particular region that is slightly different and is connected in a certain continuity. For example, a salient fragment may include three time-related frames of an activity of waving hands. The first frame shows that a man is raising a hand to a first position. The second frame shows that the man is waving the hand at the first position. The third frame shows that the man is lowering the hand to a second position. A single salient fragment does not necessarily include a dramatic change of the particular region. That is, a salient fragment represents a sequence of small and/or steady changes in activity. Once the dramatic change occurs, for example, the region gets fractured, occluded, etc., a new salient fragment starts. For example, the salient fragment described above includes only three frames because the fourth frame that follows the third frame in the video does not contain the man's hand. In other words, a salient fragment is an atom of the original video that starts when a block of pixels appears in a scene and ends when the block of pixels disappears from the scene. In some embodiments, the fragment module 201 may include an encoder to perform the functionality described herein.

In some embodiments, the fragment module 201 determines saliency of objects, extracts salient objects from the video based on the saliency, and generates a plurality of salient fragments based on the salient objects. The saliency represents a pronounced feature of the video, and the corresponding salient fragment is a highlight of the video with noticeable quality that shows the pronounced feature. For example, the fragment module 201 extracts, from a surveillance video, a salient fragment including movements of a suspect, based on the most pronounced feature being a blacklisted individual (i.e., the salient object).

In some embodiments, the fragment module 201 determines saliency of objects in a video based on at least one of motion detection, contrast, color, and semantic properties. A salient object therefore may be an object that is moving or an object that is of certain color or certain contrast. The salient object may also be an object with semantic significance. For example, for a conversation video, the fragment module 201 may determine the person who did the most talking (e.g., answers other people's questions) as a salient object based on the semantic significance. Or, for example, the fragment module 201 may determine a car with a certain label as an object with semantic significance.

In some embodiments, the fragment module 201 uses a background and foreground separation method based on motion detection to identify a moving object as a salient object. For example, the fragment module 201 extracts a salient object of a train heading to a train station (e.g., the fast-changing portion) from a video, or the fragment module 201 identifies a moving object that is not in a predomination flow of moving objects in the video as a salient object. Motion detection methods may not be applicable in extracting salient objects when there are numerous moving objects in a scene, for example, a busy highway, a crowded store, etc. In such cases, the fragment module 201 may determine a salient object based on other characteristics of the video such as the contrast, the color, the shape, the semantic information of the video, etc. For example, the fragment module 201 identifies a person riding a bike as a salient object based on the semantic information including activities performed by objects in the video. The algorithms used in identifying salient objects include a Gaussian Mixture Models (GMM) based algorithm, a visual background extractor (ViBe), an adaptive GMM, a self-organizing map algorithm, a principal component analysis algorithm, an algorithm based on low-rank decomposition for modelling background, etc.

Once a salient object is determined, the fragment module 201 links the related portions of the salient object to generate a fragment. In some embodiments, the fragment module 201 determines salient objects in each frame of the video, tracks each salient object over the length of the video, and generates a plurality of fragments based on the tracks. A simple way to track the salient object is to locate the position of the salient object from one frame to another frame and associate the salient object in one frame to the salient object in the next frame that appears at a similar spatial location. However, this simple tracking method has some problems such as overlapping objects, false detection and resulted lack of association between objects, etc. To solve the problems, the fragment module 201 may use a tracking algorithm that associates a specific color model and/or a motion vector model to a salient object to obtain a track of the salient object over time. In some embodiments, the fragment module 201 applies a Hungarian method to determine when to start and stop tracks and uses a Kalman filter method to implement multiple object tracking.

In some embodiments, the fragment module 201 defines a track of a salient object as a fragment. This video fragment includes only the salient portion of the video and lasts for the time duration of the track and is therefore also referred to as a salient fragment. The salient fragment is a portion of the video for a single salient activity localized in time and space. In some embodiments, the fragment module 201 tracks a single salient object within a certain time period of the video and generates a single salient fragment from this specific time period. In other embodiments, the fragment module 201 tracks multiple salient objects within a certain time period of the video and generates multiple salient fragments from this specific time period of the video. For example, the fragment module 201 may track, from a three-minute period of the video, a person and a car, and generate a first fragment of the person and a second fragment of the car. In some embodiments, the fragment module 201 stores the fragments in a database. In other embodiments, the fragment module 201 transmits the fragments to the segmenter 203 for further processing.

The segmenter 203 may include software and/or logic to provide the functionality for breaking fragments into segments and identifying metadata associated with the segments. A segment is a sequence of standalone short clips. In some embodiments, the segment is of fixed duration, e.g., one second, five seconds, etc. In other embodiments, the segment is of varying length, e.g., a first segment is two-seconds long, a second segment is six-seconds long, etc. In some other embodiments, each segment corresponds to an individual frame in the video.

The segmenter 203 receives fragments of a video from the fragment module 201. In some embodiments, the segmenter 203 may include a decoder to decode the received encoded input video fragments and split the decoded video fragments into segments. In other embodiments, the segmenter 203 may perform the segmenting without transcoding, i.e., segmenting may be implemented without decoding the video and re-encoding the video using the same video codec. For example, the segmenter 203 receives the input video that is encoded with I-frames (e.g., key frames) aligning with the segment splits, and splits the video into segments without having to decode its contents. This "muxing without transcoding" simplifies the segmenting because it only changes the encapsulation of the video without touching the encoded contents.

In some embodiments, the segmenter 203 determines metadata associated with a segment. The metadata can be distributed alongside or separately from the segment using the distribution application 131 of the middle sever 109 as described below. The metadata provides supplementary data of the segment ancillary to the video content. In some embodiments, the segmenter 203 determines the metadata including at least one of a start time of a segment, a time duration of the segment, an encoding status of the segment, a number of frames included in the segment, an index of key frames, a frame width, a frame height, a camera identifier, a presentation timestamp of each frame (PTS), and a decoding timestamp of each frame (DTS). In other embodiments, the segmenter 203 determines metadata information including a location of the camera, a site description and a camera configuration used to capture the segment.

In some embodiments, the segmenter 203 also includes relationship information between segments in segment metadata. In some embodiments, the segmenter 203 communicates with the fragment module 201 to determine a relationship between segments to reflect causality. For example, if a person causes an object to fall down upon entering a store and leaving the store, the segmenter 203 determines that a segment of the falling object is related to a segment of the person. The segment 203 includes a segment successor and a segment predecessor in segment metadata. In some embodiments, the segmenter 203 determines a relationship between segments based on spatial-temporal proximity of segments, e.g., if objects in two segments touch and/or influence each other at some point of time and at some point of the video. In some other embodiments, the segmenter 203 may further determine a relationship between segments based on the color, the shape, the contrast, or other properties.

In some embodiments, the segmenter 203 receives attributes computed by visual analysis of the video content of a segment and configures the attributes as metadata of the segment. For example, a saliency analyzer 257, as described below with reference to the middleware server 109, computes a motion saliency attribute by comparing the sequence of frames contained in the segment and possibly its predecessors and successors, or by performing optical flow analysis of the sequence of frames. The saliency analyzer 257 transmits the motion saliency attribute of the segment to the segmenter 203, and the segmenter 203 includes the motion saliency attribute in the segment metadata.

The segmenter 203 annotates the segment with additional metadata. In some embodiments, the segmenter 203 determines information about the presence of objects or people in the segment. For example, the segmenter 203 annotates a segment with a set of objects that appear in the segment or whether a particular category or object is present. In another example, the segmenter 203 annotates the segment with metadata that denotes whether a human face or person appears in the segment. In other embodiments, the segmenter 203 uses attributes computed by a semantic analysis of the video content of a segment as metadata of the segment. For example, the segmenter 203 annotates a segment with a natural language description of its video content or annotates another segment with an activity that is taking place during the time span of the segment (and its predecessors and successors).

In some embodiments, annotations to a segment, i.e., metadata, may pertain to the complete segment, or may be restricted to some set of pixels from a set of frames in the segment. For example, the segmenter 203 annotates a segment as having a face, and further localizes the location of the face in image space and time within the segment.

In some embodiments, the segmenter 203 transmits the segments and metadata associated with the segments to the middleware server 109 for distributing and storing. In other embodiments, the segmenter 203 stores the segments associated with a video stream in a database.

Figure 2B:
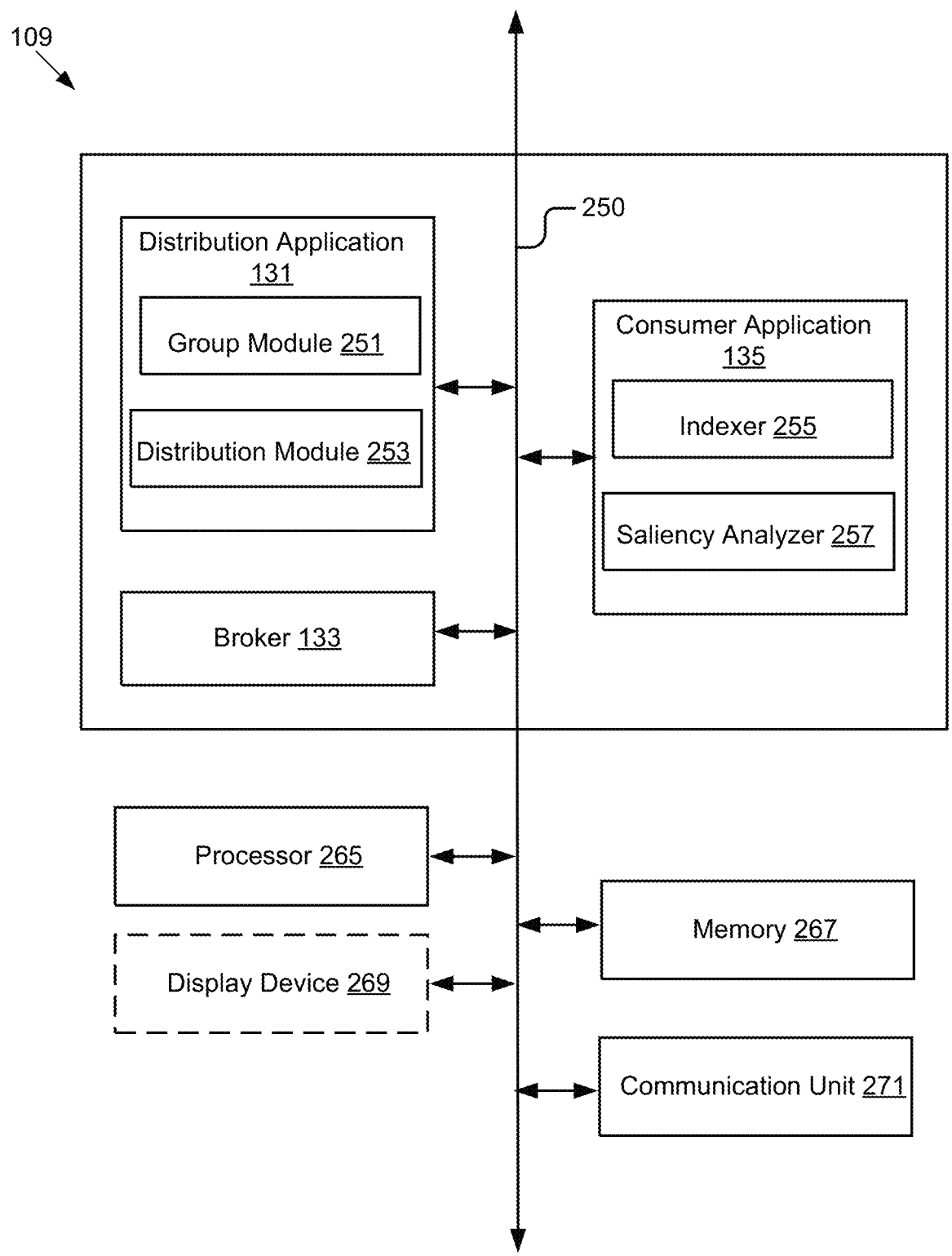
FIG. 2B depicts a block diagram illustrating one embodiment of a connect box including a middleware server.

FIG. 2B depicts a block diagram illustrating one embodiment of a middleware server 109 including a distribution application 131, a broker 133, and a consumer application 135. The middleware server 109 may also include a processor 265, a memory 267, an optional display device 269 and a communication unit 271, which perform similar functionality as that of 235, 237, 239, and 241 as described above with reference to FIG. 2A, and therefore will not be repeatedly described here. The components of the middleware server 109 are communicatively coupled to a bus 250 for communication with each other.

In some embodiments, the distribution application 131 includes a group module 251 and a distribution module 253.

The group module 251 may include software and/or logic to provide the functionality for grouping fragments and associated segments of a video stream into topics. A topic is a category to which records (e.g., video content) are published.

A video stream may have a variety of sources including a capture device, a video storage device, a video producing device, or a combination of these sources. The capture device may be a smart camera capable of decomposing the captured video stream into segments. The video storage device may be a database that stores video files. The video producing device may be a network video recorder (NVR), a video management system (VMS), or a cloud-based recorder that produces natural video content. Or the video producing device may be a visualization or video reconstruction device that produces synthetic content (e.g., a video synopsis). The video stream from different sources are decomposed into fragments/segments and transmitted to the group module 251, where a fragment/segment is grouped into topics.

The group module 251 handles a fragment/segment of a video stream as a data object and handles the evolution of a fragment/segment as an update. The group module 251 associates a data object (e.g., a fragment or a segment) of the video stream with a unique identifier in a namespace by assigning a name or a locator to the data object, and groups the data object into topics based on the identifier. In some embodiments, the group module 251 assigns a universally unique identifier (UUID) to each segment. Regardless of two segments originating from a same fragment or from a same video stream, the group module 251 assigns the segments with distinct identifiers to ensure that each segment is unique. Based on the assigned identifiers, the group module 251 groups the segments into topics.

In some embodiments, the group module 251 associates an exclusive topic with a single fragment/segment. In other embodiments, the group module 251 assigns a fragment/segment to multiple topics. For example, in addition to assigning a segment to topic "camera A" based on the segment source, the group module 251 also assigns the segment to the topic "bicycle" based on the segment containing a salient object of a bicycle. In some other embodiments, the group module 251 groups multiple video fragments/segments to a single topic, for example, multiplexing the segments originating from a same capture device into a single topic. In other embodiments, the group module 251 may group the fragments/segments from the same capture device into multiple topics to spread load. In some other embodiments, when the video processing application 103 decomposes a video stream into a single fragment/segment, the group module 251 groups the fragment/segment representing the entire video into a singleton topic.

The distribution module 253 may include software and/or logic to assign the distribution of the fragments/segments of the video to brokers and/or servers. In some embodiments, the distribution module 253 may distribute the fragments/segments of the video based on sharding the segments by topic. In databases, sharding is a horizontal partitioning of data in a way that each partition is kept on a separate server or broker at different physical locations. Thus, sharding not only splits tables of a database into one or more tables by row as in horizontal partitioning, but also spreads the pieces of the table across separate instances of the database and schema. Sharding therefore spreads the load of data processing. The idea of sharding is not exclusive to tables. A dataspace (or one of its subsets) can also be horizontally partitioned or sharded to ensure that no individual data objects are split. Sharding is therefore applicable to datacentric communications, where each shard is handled by separate servers or communication brokers to achieve scaling.

In some embodiments, the distribution module 253 spreads topics along with the associated fragments/segments amongst different servers or brokers according to a naming scheme. For example, the distribution module 253 identifies a prefix "store" from a topic of "store-stream-001," and determines to distribute the topic and a first segment that is grouped into the topic to a first broker running on a first middleware server. The distribution module 253 may also determine to distribute topics with a prefix "warehouse" and segments grouped into the topics to a second broker running on a second middleware server. A person of ordinary skill in the art will recognize that many other naming schemes for fragments/segments and topics are possible.

In other embodiments, the distribution module 253 may also shard the topics themselves and spread the sharded topics and associated fragments/segments to separate brokers and/or servers. For example, the distribution module 253 may split a topic into partitions and assign each partition of the topic to a different broker. Distributing fragments/segments to brokers based on topics is particularly advantageous. First, since the distribution module 253 assigns topics and associated data (e.g., fragments/segments) to the brokers according to the naming schemes, producers and consumers of the data do not need to know or be concerned with the location of other participants or specific brokers for the data distribution. Second, by sharding topics, the distribution module 253 distributes the fragments/segments with increased throughput.

In some embodiments, the distribution module 253 may divide a topic into partitions and associate each partition with a commit log. A commit log is an append-only, ordered sequence of records. In some embodiments, the distribution module 253 appends records to the end of the commit log and assigns each record a unique sequential entry number or timestamp. For example, the entry number is an offset that indicates the position of a record in the partition. Because the distribution module 253 appends the latest record to the end of the commit log, the commit log defines a notion of time without relying on any particular physical clock. The distribution module 253 therefore stores the changes or updates of the underlying data object, i.e., a commit history, to the commit log.

FIG. 3A depicts an example commit log 300 that is associated with a single partition of a topic. The distribution module 253 writes the first record in the first position 302 of the log as labelled by an offset "0." The distribution module 253 then appends the sequence of records to the log in an order of continually increased offset numbers. In the example of FIG. 3A, the distribution module 253 has filled the first 12 positions of the log, i.e., offset "0" through offset "11," with 12 records, and would append the next or most recent record to offset "12." FIG. 3B depicts an example commit log 320 that is associated with multiple partitions. The multiple partitions may be from one or more topics. The distribution module 253 may write a record to each partition, for example, writing a first record to offset "12" of partition 0, writing a second record to offset "9" of partition 1, and writing a third record to offset "10" of partition 2.

Figure 3C:
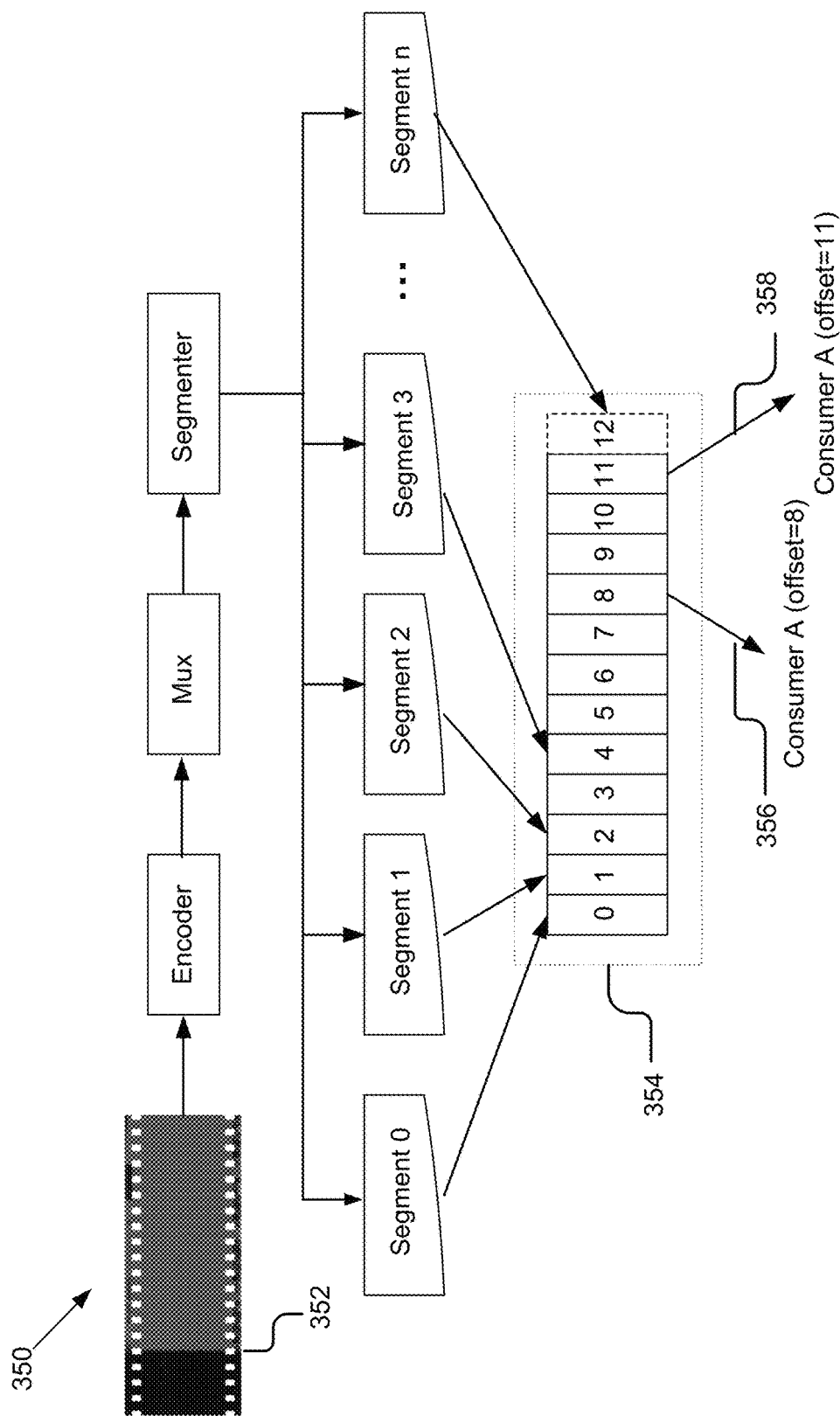
FIG. 3C depicts a block diagram illustrating one embodiment of a method for segmenting video fragments and publishing the segments to a corresponding topic.

In some embodiments, the records written or published in a commit log by the distribution module 253 are video segments received from the segmenter 203. The segmenter 203 may be implemented as an application running on a smart capture device or on a computer device that connects to multiple capture devices (e.g., passive capture devices 107). FIG. 3C depicts a block diagram 350 illustrating one embodiment of a method for segmenting video fragments and publishing the segments to a corresponding topic. An encoder included in the fragment module 201 of the video processing application 103 receives the video fragment 352. The encoder encodes the video I-frames aligned with the desired segments splits. The encoded fragment is sent to a "muxing" block that changes the encapsulation of the video to the MPEG-TS digital container format without transcoding. This "muxing" step produces a sequence of standalone clips with the desired segment splits. The segmenter 203 assigns the standalone short clips to different segments, i.e., segments 0, 1, 2, . . . n. Each segment is considered an update of the same data object representing video fragment 352. The segments are then published by the distribution module 253 into the topic. As depicted in FIG. 3C, the distribution module 253 publishes the segments in the commit log 354. The commit log 354 includes a partition associated with the topic. The distribution module 253 publishes or writes segment 0 in the offset "0," segment 1 in the offset "1," segment 2 in the offset "2," and so on. As a result, the partition is an ordered and immutable sequence of records.

It is noted that consumers can also access the video segment as indicated in items 356 and 358. A consumer is a user that subscribes to the topic associated to the log and accesses (e.g., reads) the log history. The offset of the consumer in the log controls the order in which records are consumed by the consumer. In FIG. 3C, for example, consumer A can reset to an older offset by skipping ahead to a more recent record, and thus read the video segment at offset "8" as indicated in item 356. On the other hand, consumer B simply moves to the most current record—the "head," and thus reads the video segment at offset "11" as indicated in item 358.

Figure 3D:
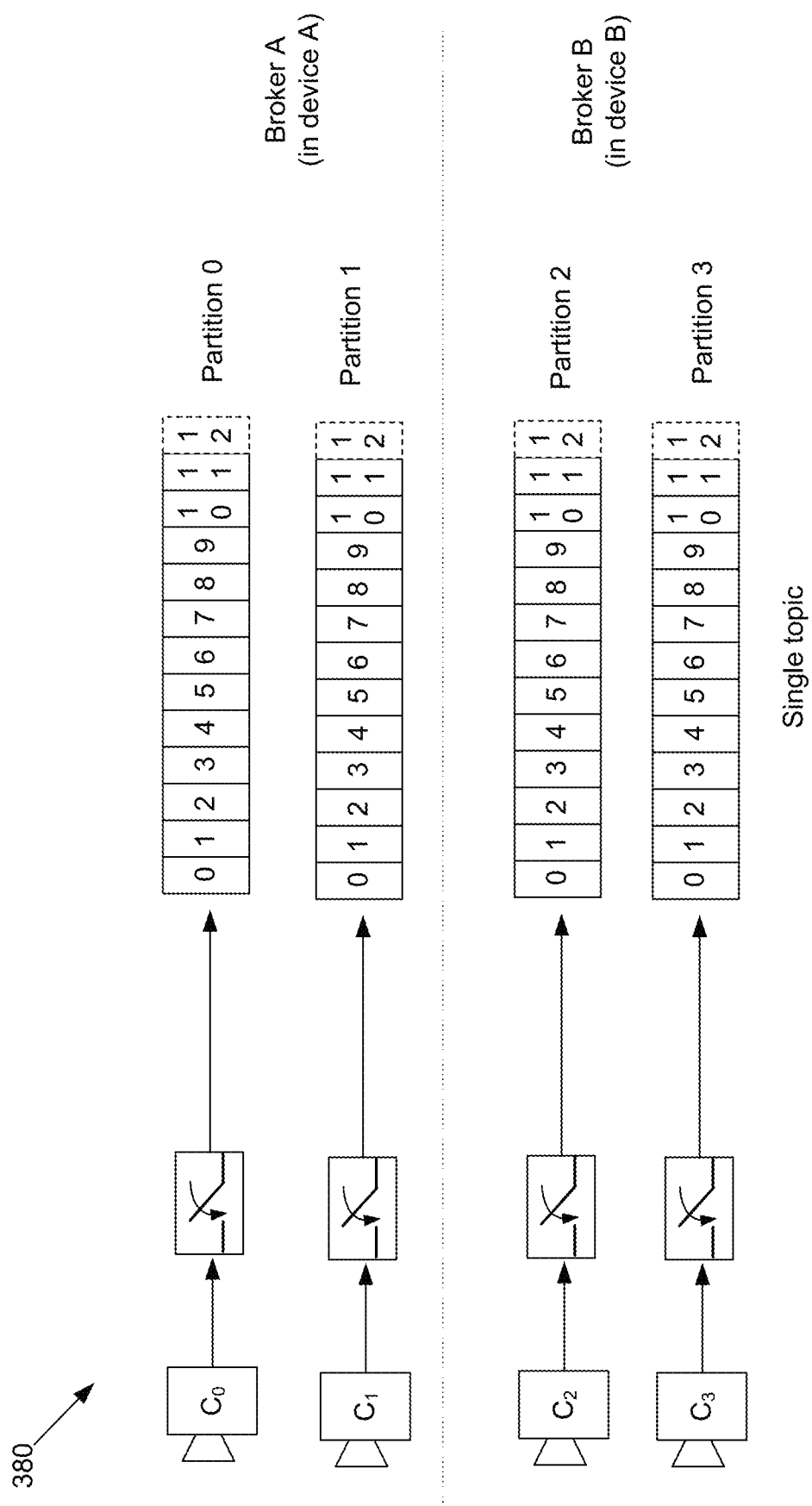
FIG. 3D depicts a block diagram illustrating one embodiment of a method for assigning each video stream from multiple capture devices to an exclusive commit log under a same topic.

A commit log may contain records originating from a single capture device or multiple capture devices. FIG. 3D depicts a block diagram 380 illustrating one embodiment of a method for assigning each video stream from multiple capture devices to an exclusive commit log under a same topic. As illustrated in FIG. 3D, a distribution module 253 of a middleware server 109 receives segments decomposed from the video stream originating from each captures device $C_0$, $C_1$, $C_2$, and $C_3$, and distributes the segments to a dedicated partition under a same topic, for example, "cameras." Since every partition, i.e., partition 0, 1, 2, and 3, is an independent commit log, the distribution module 253 assigns each video stream exclusively to one commit log.

Referring back to FIG. 2B, the broker 133 manages a commit log, which can be implemented using a combination of hardware and software on a hardware device managing middleware (e.g., the middleware server 109 managing Kafka). For example, the broker 133 updates the records and metadata associated with the commit log. The number of brokers is driven by the number of hardware devices managing the middleware, typically one broker per device or per middleware server. In the example of FIG. 3D, broker A running on a physical device A (e.g., the middleware server 109 in FIG. 1) and broker B running on a physical device B (e.g., another middleware server not shown in FIG. 1) are used to manage the four commit logs corresponding to partition 0, 1, 2, and 3. In some embodiments, the broker 133 also communicates with the video processing application 103, the distribution application 131, the consumer application 135, and other components of the system 100 to retrieve data from the log and provide the data to a user.

In some embodiments, the consumer application 135 includes an indexer 255 and a saliency analyzer 257.

The indexer 255 may include software and/or logic to perform an indexing operation including archiving segments associated with a video stream in persistent storage and adding a record in a database for each segment processed.

When archiving the segments decomposed from a video stream in persistent storage, the indexer 255 may store the segments in a single device or in an array of devices configured to provide redundancy in the event of failure. The persistent storage may be the local persistent storage 145 (e.g., on the edge side) as depicted in FIG. 1 or may reside in a remote location in the cloud. An ordinary person skilled in the art may also recognize that many forms of persistent storage can be used to archive the segments, such as magnetic media, optical-magnetic, solid state, etc. In some embodiments, the indexer 255 also stores segment metadata along with the segments in the persistent storage.

When adding a record of a segment into a database, the indexer 255 includes the universal identifier (UUID) assigned to the segment and the location at which the segment is stored in the record. In some embodiments, the indexer 255 adds metadata of the segment received from the video processing application 103 to the record of the segment. In other embodiments, the indexer 255 also identifies and includes a subset of metadata of the segment in the record.

The indexer 255 associates an index with each segment record in the database. The index is a data structure that improves the speed of data retrieval operations on a database table at the cost of additional storage space and computation. In response to a query, the index is used to quickly locate and retrieve data (e.g., segments) by limiting the number of records that need to be searched.

In some embodiments, the indexer 255 indexes video segments based on a start time and a stop time of a segment. In other embodiments, the indexer 255 also indexes video segments based on segment metadata such as relationship information between segments. For example, the indexer 255 establishes a connectivity graph between the segments as they overlap at some point of time and at some point of the video (i.e., having a spatio-temporal overlap), and assigns an index to the segments based on the connectivity graph. In another example, the indexer 255 establishes a connectivity graph between the segments based on causality information, i.e., cause-and-effect relationships, and assigns an index to the segments based on the connectivity graph. Indexing segments based on spatio-temporal relationship or the cause-and-effect relationship is particularly beneficial to efficiently resolve a complex query.

In some embodiments, the consumer application 135 configures the indexer 255 as more than one process running parallel in different computing devices such that multiple indexers or indexer instances can be used to process multiple segments at a same time. Each indexer instance is a process that performs the indexing operation. For example, the consumer application 135 configures the indexer 255 to run as a Kafka consumer group subscribed to a topic containing the video segments. Based on this configuration, every segment is read by one and only one indexer instance, and thus the indexing operation is spread among multiple processes to increase the throughput of the system 100. In other words, only one appropriate indexer is identified from multiple indexers to read a segment from a commit log and perform an index operation on the segment. The indexing operation includes one or more of archiving the segment in persistent storage and adding a record of the segment to a database.

The saliency analyzer 257 may include software and/or logic to analyze segments of a video stream to determine the occurrence of a salient event.

A video segment including only static or slow-moving objects, e.g., a neon beacon of a theater that is repetitively flashing in a surveillance video, is usually no interest to a user. However, it is valuable to analyze a video segment including rich and eventful content, e.g., a salient event that reflects a drastic change of video content. In some embodiments, the saliency analyzer 257 may include one or more saliency analyzers that specialize on different saliency attributes. For example, the saliency analyzer 257 may be a motion analyzer that asserts the presence of motion in a segment or may be a face detection analyzer that asserts the presence of a human face in the segment. In some embodiments, a motion analyzer computes an amount of motion contained in the segment using background subtraction techniques. In other embodiments, the motion analyzer performs optical flow analysts to assert the presence of motion. In addition to motion detection of the motion analyzer, the one or more saliency analyzers also determine different saliency attributes based on color analysis, contrast analysis, semantic information analysis, face recognition, and other techniques.

In some embodiments, the saliency analyzer 257 is triggered by receiving a sequence of video segments. In other embodiments, one saliency analyzer 257 is triggered by the assertion of another saliency analyzer 257. For example, a face detection analyzer will operate only on the segments for which a motion analyzer reports motion. Activating a saliency analyzer when needed or on-demand reduces computation and network resource costs.

Similar to the indexer 255, the consumer application 135 also configures one or more saliency analyzers of a given type to run in parallel in different computing devices to perform parallel saliency determination operations. For example, the consumer application 135 configures the motion analyzers to run as a Kafka consumer group subscribed to a topic containing the video segments. Based on this configuration, the saliency determination operation is spread among multiple processes to increase the throughput of the system 100 as each segment is read by one and only one motion analyzer.

In some embodiments, the saliency analyzer 257 transmits its output to the indexer 255 and the indexer 255 records the output of the saliency analyzer in the database using the UUID of the segment as primary key. In other embodiments, the saliency analyzer 257 communicates with the distribution application 131 to distribute the output of the saliency analyzer to different processes using data-centric distributed approach based on commit logs. For example, the output of saliency analyzers of different types may be organized along topics. A motion analyzer writes its assertion of the presence of motion to the topic "Moving content," whereas a face detection analyzer writes its assertion output to the topic "Detected faces." A consumer process can thus subscribe to different salience events of different topics.

Figure 4:
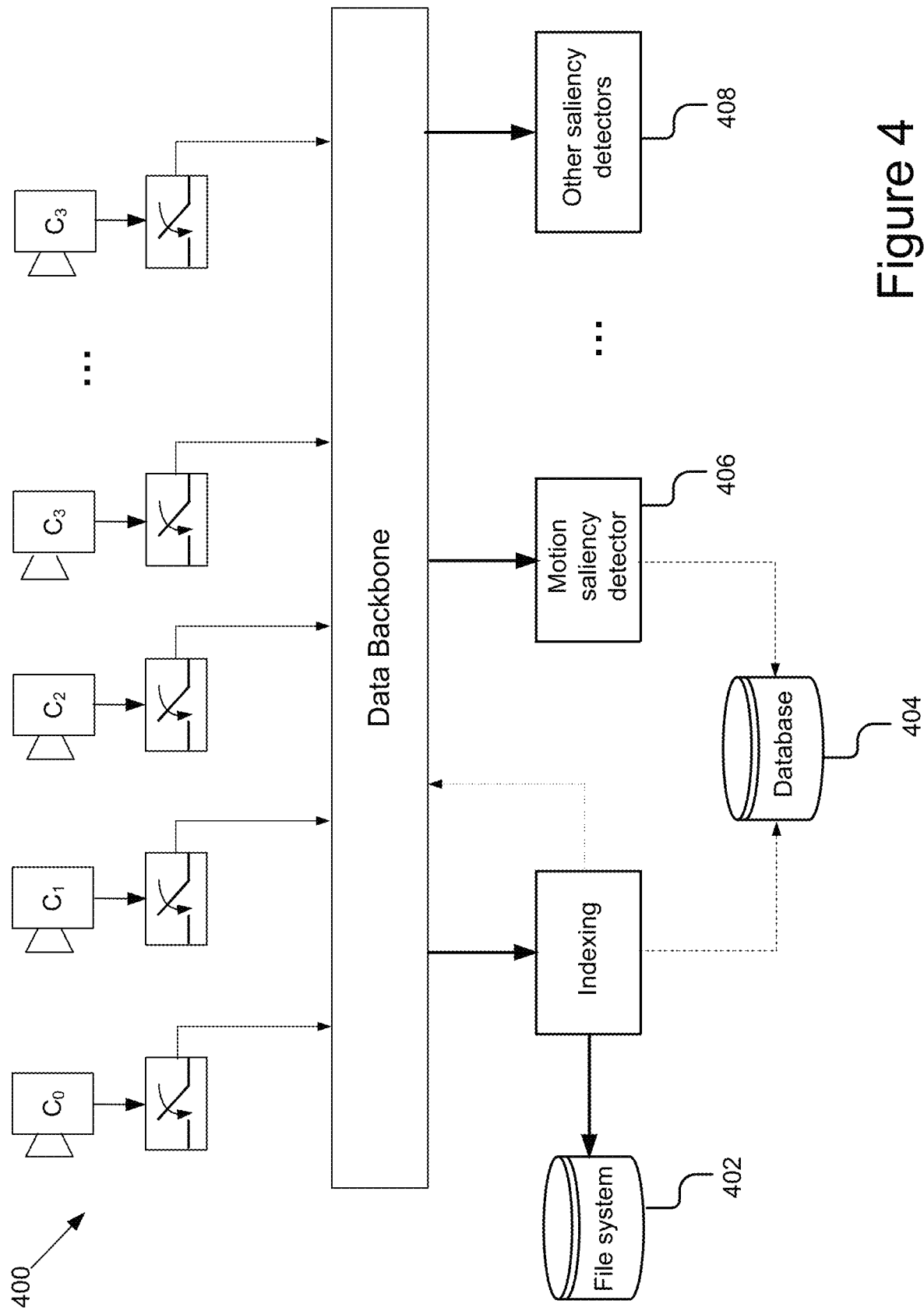
FIG. 4 depicts a block diagram illustrating one embodiment of a method for indexing and storing segments of a video stream.

FIG. 4 depicts a block diagram 400 illustrating one embodiment of a method for indexing and storing segments of a video stream. The capture devices $C_0$, $C_1$, $C_2$, $C_3$, ... $C_n$ may be passive capture devices connecting to one or more computer devices 101 or smart capture devices. The video processing application 103 including the fragment module 201 and the segmenter 203 running on the one or more computer devices 101 or the smart capture devices decompose the video streams from the capture devices $C_0$, $C_1$, $C_2$, $C_3$, ... $C_n$ into segments. The video processing application 103 transmits the segments to the middleware server 109 managing a data-centric middleware (e.g., Apache Kafka, the backbone) to distribute the segments to different processes based on commit logs.

The distributed processes running as independent consumers can read the segments by subscribing to an appropriate topic. For example, the indexer 255, which is configured to run as a Kafka consumer group subscribed to a topic containing the video segments, may perform an indexing operation including storing a segment in a file system 402 and adding a record of the segment to a database 404. The file system may be placed in persistent storage 145 in FIG. 1 and the database 404 may be the database 143 in FIG. 1. The record of the segment includes a UUID of the segment, the location at which the segment is stored, etc. In some embodiments, the indexer 255 also receives the output of the saliency analyzer 257 and records the output of the saliency analyzer in the database 404 using the UUID of the segment as primary key. The saliency analyzer 257, which is also running as a Kafka consumer group subscribed to a topic, may detect saliency of a segment that it reads. As illustrated in FIG. 4, the saliency analyzer 257 includes a motion saliency detector 406 and other saliency detectors 408 of other types. Different types of saliency analyzers or detectors may specialize on different saliency attributes.

Figure 5A:
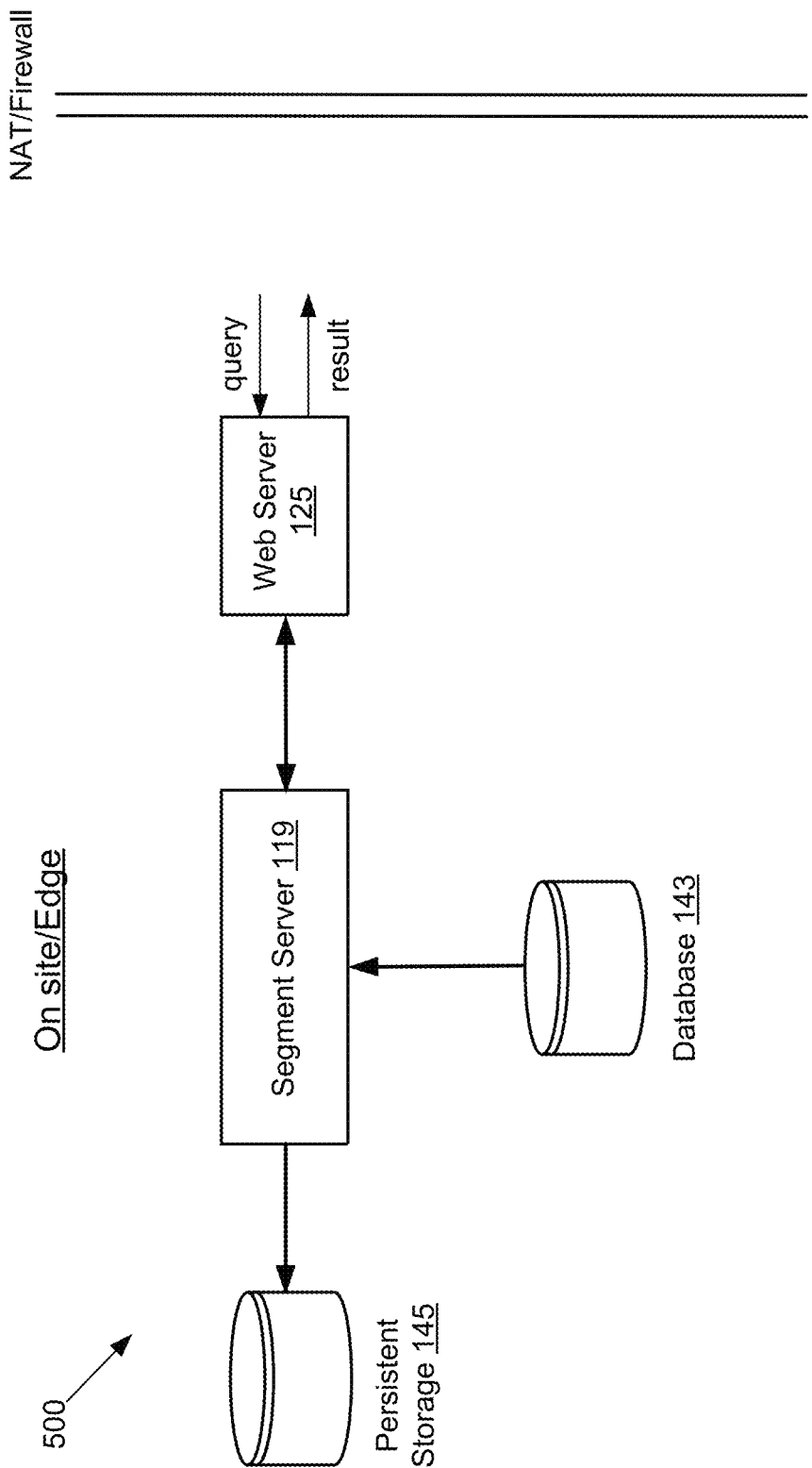
FIG. 5A depicts a block diagram illustrating one embodiment of a method for retrieving data related to a video segment from a segment server.

FIG. 5A depicts a block diagram 500 illustrating one embodiment of a method for retrieving data related to a video segment from a segment server. The segment server 119, the web server 125, the database 143, and the persistent storage 145 are extracted from FIG. 1 to simplify the description of the retrieval procedure as shown in FIG. 5A. In the illustrated embodiment, the segment server 119, the web server 125, the database 143 and the persistent storage 145 are connected via a Local Area Network (LAN) or different LANs behind a firewall, which is referred herein as "on site" or "edge" to distinguish from "the cloud." The "on site/edge" represents the internal connections and entities protected by the firewall (e.g., a LAN), while "the cloud," which will be described in FIGS. 5B and 5C below, represents the outside connections and entities (e.g., a Wide Area Network or WAN).

In the example of FIG. 5A, the web server 125 receives a query for a visualization from a client device (e.g., a mobile device of a user, a capture device), and transmits the query to the segment server 119. The segment server 119 returns a result in response to the query. The result may include a list of segments satisfying a given set of restrictions specified in the query. In some embodiments, the result may further include content or metadata of a segment.

The set of restrictions specified in the query includes different types of restrictions. A restriction can be temporal, for example, specifying a starting time and duration of a period of interest. A restriction can be spatial, for example, indicating a recording location or an identifier of a capture device. A restriction can also apply to metadata attributes, for example, saliency attributes. If a particular segment is not specified in the restriction, in some embodiments, the segment server 119 identifies a list of UUIDs of the segments satisfying the query and returns the list of UUIDs as the result. For example, the segment server 119 identifies the segments including the saliency attribute of "moving bus" and returns the UUIDs of the segments. In other embodiments, the segment server 119 also retrieves the content or metadata of a particular segment. The segment server 119 may return content of the segments with the saliency attribute of "moving bus" in the above example. Or the segment server 119 may receive one or more UUIDs of one or more segments specified by the client device in the set of restrictions of the query and return content or metadata of the one or more segments.

In some other embodiments, the segment server 119 may offer discovery functionality to allow connecting client devices to know which metadata attributes can be queried and their valid ranges. The segment server 119 identifies a metadata attribute and associated range for parameterizing a query and transmits the metadata attribute and range to a client device so that the client device can specify a set of restriction of a query based on the metadata attribute and range. For example, the segment server 119 may offer a list of identifiers of known capture devices, valid time ranges when each capture device is active, metadata attributes that has already been computed for a segment, and metadata that can be computed on demand, for a client device to determine a parameter or a restriction of a query.

Figure 5B:
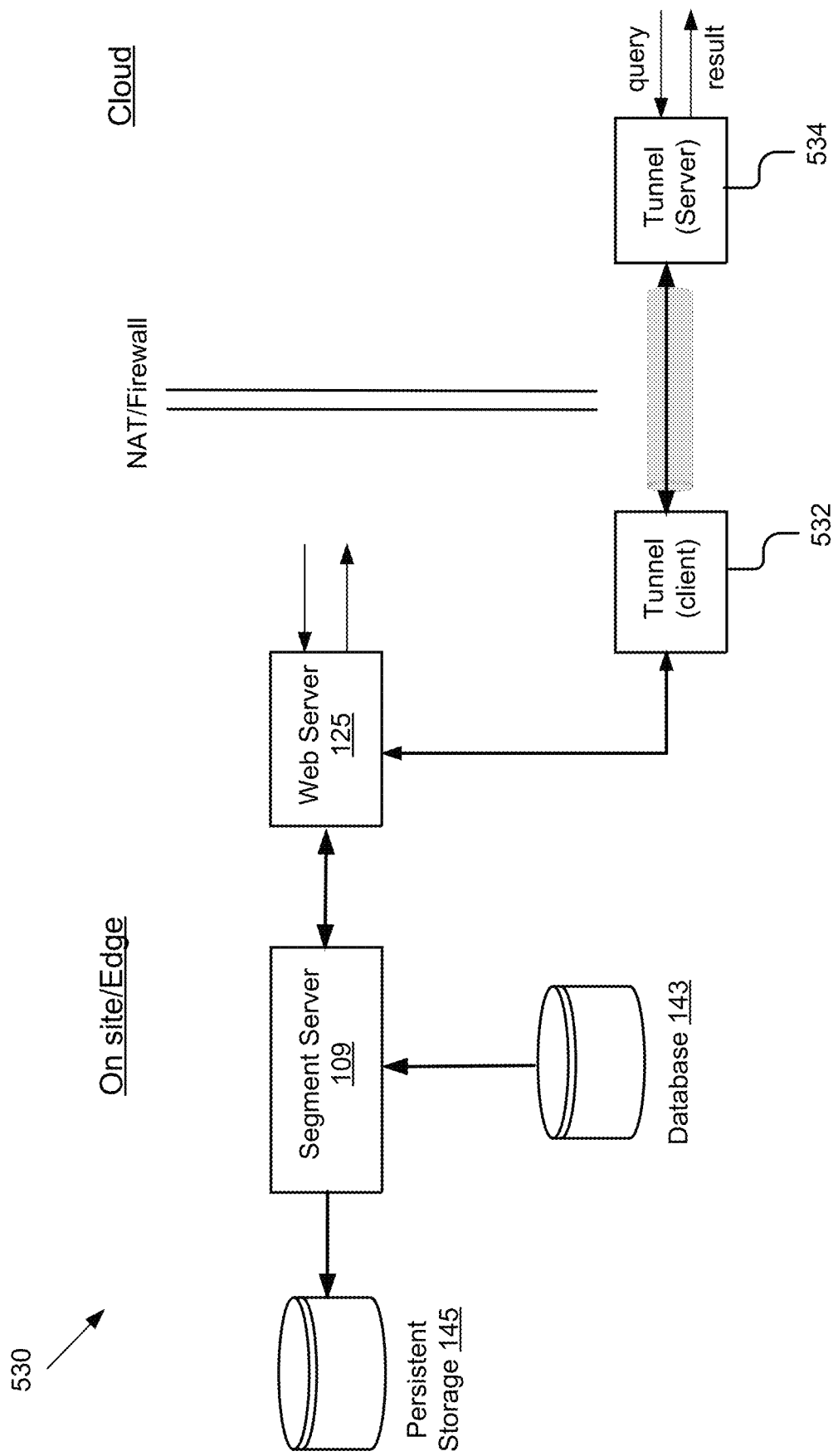
FIG. 5B depicts a block diagram illustrating one embodiment of a method for accessing a segment server using a tunnel from a remote device.

FIG. 5B depicts a block diagram 530 illustrating one embodiment of a method for accessing a segment server using a tunnel from a remote device. In FIG. 5B, the "on site/edge" entities are typically deployed within a LAN, which is isolated from the WAN or the cloud by a network address translation (NAT)/firewall. As a result, the remote device (e.g., visualization server 121) in the cloud cannot connect to the segment server 119 located on site/edge unless port forwarding or similar operation is done at the NAT/firewall.

A reverse tunnel can be used to allow a remote device to connect to the segment server 119. The reverse tunnel can be implemented using different technologies, such as Web Sockets and SSH Reverse Tunnel. As illustrated in FIG. 5B, a tunnel client 532 makes an outgoing connection to a tunnel server 534 to establish a TCP/IP connection. The outgoing connection is typically not blocked in many consumer and commercial environments. Once the connection is established, a reverse tunnel is created. Data (e.g., a query) that is to be transmitted to the segment server 119 is first directed to the tunnel server 534. The tunnel server 534 encapsulates the data within the communication protocol used to establish the connection between the tunnel client 532 and the tunnel server 534 and sends the encapsulated data to the tunnel client 532. The tunnel client 532 then de-encapsulates the data and sends the de-encapsulated data to the segment server 119.

Figure 5C:
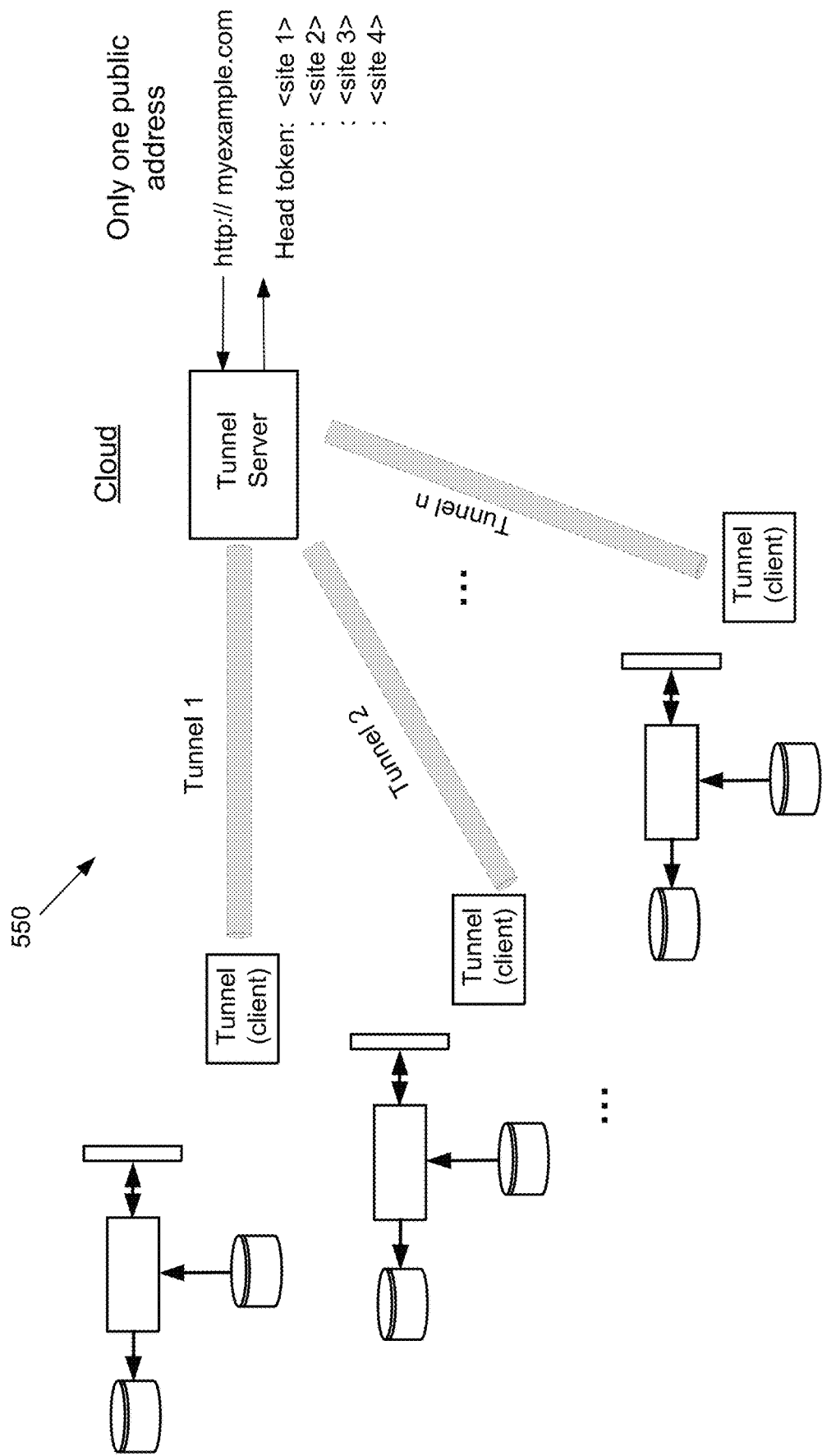
FIG. 5C depicts a block diagram illustrating one embodiment of a method for identifying and accessing a segment server of a plurality of segment servers from a remote device.

FIG. 5C depicts a block diagram 550 illustrating one embodiment of a method for identifying and accessing a segment server of a plurality of segment servers from a remote device. As shown in FIG. 5C, in real environment, a plurality of segment servers or segment server instances may be deployed across multiple sites, each site behind its own NAT/firewall. In such situation, a plurality of tunnels, e.g., tunnel 1, tunnel 2 . . . tunnel n established between a plurality of tunnel clients and a tunnel server in FIG. 5C, need to be used to access the plurality of segment servers. Each tunnel can be created by a tunnel client making an outgoing connect to the tunnel server. Each tunnel is assigned with a token from a plurality of tokens.

However, managing the plurality of tunnels from many locations can be challenging. In some embodiments, a remote device (e.g., the visualization server 121) uses a single URL address to reach any of the plurality of segment servers. The remote device specifies a particular segment server to be accessed with a token contained in the header of the HTTP request associated with the URL address. Each site (i.e., tunnel) is assigned a different token when created. This token can also be used to identify the particular segment server connected via the tunnel. For example, the remote device sends an access request to the tunnel server for accessing the segment servers behind the firewalls, the access request including a URL address. The remote device specifies the segment server to be accessed using a request (e.g., "HEAD token: <site 3>") in the header of the HTTP request associated with the URL address. When the tunnel server receives the token specified in the HTTP request, the tunnel server compares it with the plurality of tokens assigned to the plurality of tunnels and determines that the remote device wants to access the segment server on site based on the token match. The tunnel server then transmits the access request to the particular segment server on site to allow data transfer between the remote device and the particular segment server through the tunnel. The remote device therefore directs a request to any segment server by using the same URL address. From the perspective of the remote device, the HTTP requests have the same structure regardless of where the segment server is located. This dramatically reduces the complexity of the client connection logic.

Figure 6:
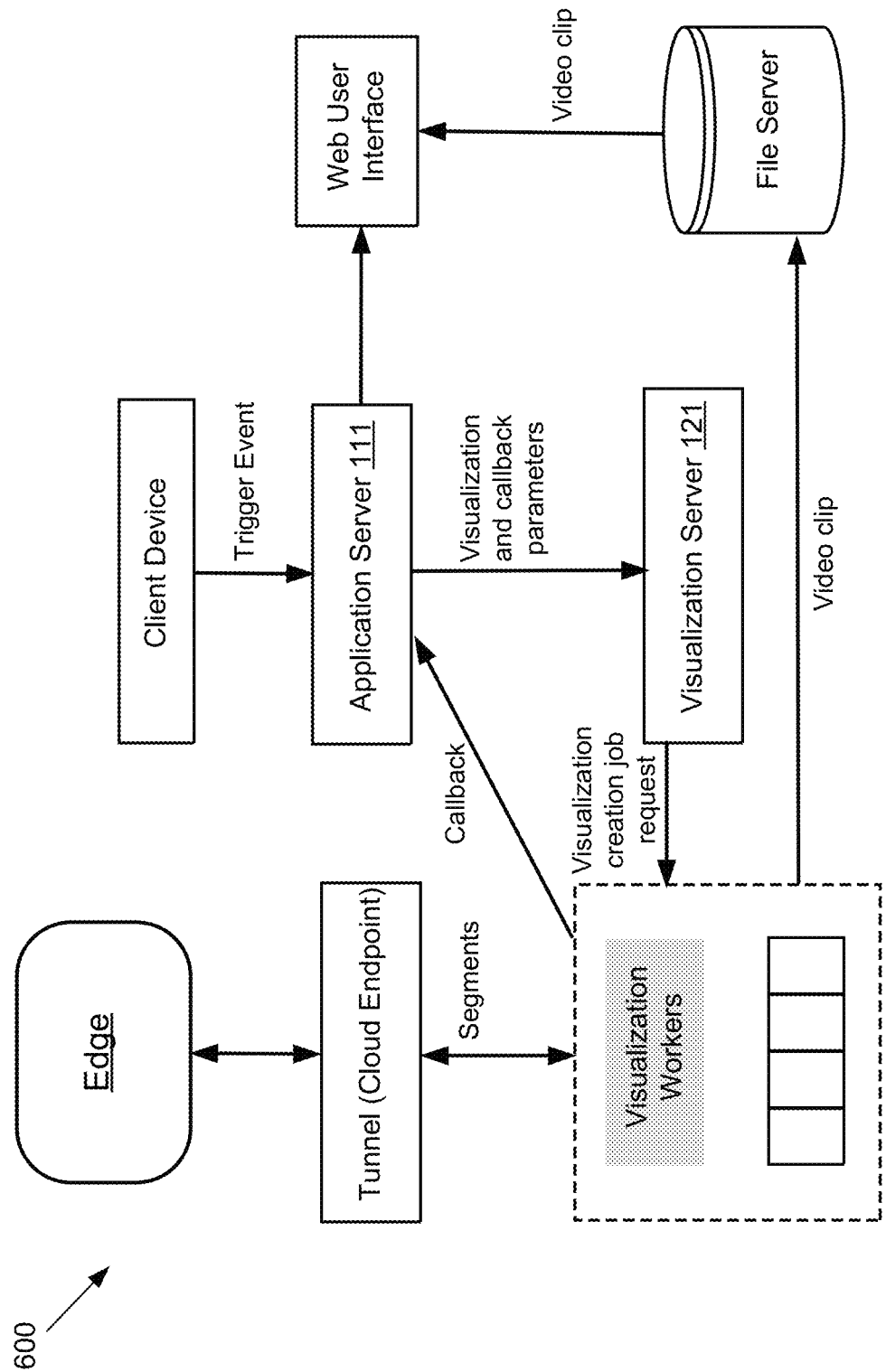
FIG. 6 depicts a block diagram illustrating one embodiment of a focalized visualization subsystem.

FIG. 6 depicts a block diagram 600 illustrating one embodiment of a focalized visualization subsystem. Although this subsystem may be decoupled from a subsystem handling queries and segment retrieval, and a subsystem decomposing and organizing the video fragments and segments as described above with reference to FIGS. 2A, 2B, and 5A, all these subsystems of system 100 work together to produce a focalized visualization. A focalized visualization is a visualization produced around a focus of attention representing a location, event, or subject of interest. The entities such as a client device, the application server 111, the visualization server 121 in the subsystem depicted in FIG. 6 incorporate with other entities in the system 100 to implement the functionality of providing a visual representation of the activities occurring in the time and space surrounding the focus of attention.

The client device detects the focus of attention that triggers the application server 111 to generate a query for a focalized visualization. The focus of attention is also referred as a trigger event or an external trigger. The term "external" means that the event triggering the visualization can be produced by an external system or apparatus that connects to the system 100. In some embodiments, the client device may be one of a capture device 107, a smart capture device 123, a sensor 113, a user device 115, and other devices such as a timer.

In some embodiments, the capture device 107 or the smart capture device 123 detects a trigger event, including a shopper moving throughout a store, a traveler traversing a secure or sterile area in an airport, or a user opening a smart locker, and sends the trigger event and associated metadata (e.g., a time, a location) to the application server 111 to create a query.

The sensor 113 may be a motion detector, a proximity detector, an accelerometer, a thermometer, etc. A proximity detector may determine a user crossing of a virtual fence and trigger the application server 111. In other embodiments, the sensor 113 sends a trigger event to the application server 111 upon determining that a condition is met. For example, an on-board accelerometer sends a trigger event to the application server 111 when the acceleration measured by the accelerometer exceeds a pre-determined threshold.

In some embodiments, a user device 115 accessed by a user also triggers the generation of a query. For example, an application installed and executed on a mobile device of a user sends a trigger event for generating a query in response to an internal condition within the mobile device, e.g., proximity of the mobile device to a Bluetooth Low Energy (BLE) beacon, is met. In such case, the mobile application of the user device 115 is awaken by the BLE beacon and communicates to the application server 111 with an identifier of the detected beacons, signal strengths, a time of occurrence, etc. The mobile application may compute a rough estimate of the location of the mobile device using the placement of the detected beacon and signals strengths using trilateration techniques. The application server 111 described below will then create a query by specifying the cameras covering the location of the mobile device at the time of occurrence.

In other embodiments, a user may manually send a signal to the application server 111 to trigger the query generation using the user device 115 accessed by the user. For example, a store manager sends an explicit query for requesting a summary of the activities in a given area of a store, or a security personnel manually sends a request for a summary of the activities of a person in a given building. In some other embodiments, a timer is used to trigger the application server 111 to generate a query for a focalized visualization, for example, creating a query for summary visualizations for a given area of a store at fixed periods of time (e.g. every day).

Once the application server 111 receives the trigger event, the application server 111 converts the trigger event to a query for a focalized visualization reflecting the activities during the occurrence of the trigger event. The application server 111 also communicates with the client device and the segment server 119 to specify a set of parameters or restrictions in the query. For example, the application server 111 determines temporal parameters such as a starting time and a time duration, spatial parameters such as an identifier of a source capture device, a recording location, etc. The parameters specify filters operating on the query. In some embodiments, the application server 111 also uses metadata attributes to specify a restriction/parameter. For example, the application server 111 parameterizes a query to retrieve the visualization that composes only the segments with an amount of motion above a specified threshold. By setting the restriction in the query, segments are filtered by the amount of motion content prior to the retrieval. In another example, the application server 111 configures the query to retrieve the visualization is composed only of segments containing a person.

The query parameters specifying a visualization can be either determined in advance or dynamically specified. For example, the application server 111 may specify the duration of a visualization in a query in advance but determine the starting time of the visualization as a function of the time of occurrence of the trigger event. Conversely, the application server 111 may dynamically determine the duration based on a type of the trigger event. In different situations, a subset of the query parameters specifying a visualization can be a function of the properties of the trigger event.

Responsive to receiving the query for a visualization from the application server 111, the visualization server 121 computes the visualization. In some embodiments, the visualization server 121 also responds the query with a URL locator where the visualization will be placed. As depicted in FIG. 6, the visualization server 121 dispatches the actual work of computing the visualization to one or more visualization workers through a job queue, for example, by sending a visualization creation job request. The visualization creation job request includes the query and associated restrictions/parameters. In some embodiments, the visualization creation job request also includes one or more callback parameters of an external system (e.g., a client device) so that the external system can be notified of the result and/or progress of the visualization job. In other embodiments, the visualization server 121 also provides a URL locator to an external system such that the state and/or result of a visualization job is visible to the external system through this URL locator.

A visualization worker is a subsystem capable of generating visualizations. In some embodiments, the visualization server 121 manages visualization workers using a thread pool. In other embodiments, the visualization server 121 manages visualization workers using a process pool. In a preferred embodiment, the visualization workers are independent process running on a plurality of computer devices.

In response to receiving a visualization job, the visualization worker may communicate with a segment server (e.g., the segment server 119) to retrieve the relevant segments, process the content of the relevant segments, and assemble the segments into a visualization. In some embodiments, the visualization worker transmits the query and associated restrictions/parameters to a segment server. The segment server identifies and retrieves the relevant segments and sends the retrieved segments to the visualization worker to create the visualization. In other embodiments, the visualization worker identifies the segments required to create the visualization from the visualization creation job request including the query and query parameters and requests the identified segments from a segment server. As depicted in FIG. 6, the segment server may be located at a LAN/Edge. The visualization worker running on a cloud server communicates with the segment server through a tunnel as described above with reference to FIG. 5B.

In some embodiments, the visualization worker stores frequently accessed segments in a local cache to reduce the number of queries handled by the segment server. In other embodiments, multiple visualization workers share a common cache of visualization segments. In some other embodiments, the visualization worker may have a direct access to the file system where the segments are stored.

In some embodiments, the visualization worker encodes the final visualization into a suitable format to allow HTTP streaming. In some embodiments, the visualization worker may encode the visualization for adaptive bitrate streaming according to the HTTP Live Streaming (HLS) standard. In other embodiments, the visualization worker may encode the visualization for adaptive bitrate streaming according MPEG-DASH (DASH) standard. In some other embodiments, the visualization worker may encode the visualization for HTTP download and playback compatibility across devices, such as MPEG-4 Part 14 standard (MP4) and H.264 Part 10 standard (MPEG-4 AVC). Once the visualization creation job completes, the visualization server 121 outputs the final visualization as a result of the query. In some embodiments, the visualization server 121 puts the resulted visualization at a location of a URL locator. The URL locator has been provided to the external system prior to the completion of the visualization creation job.

Figure 7A:
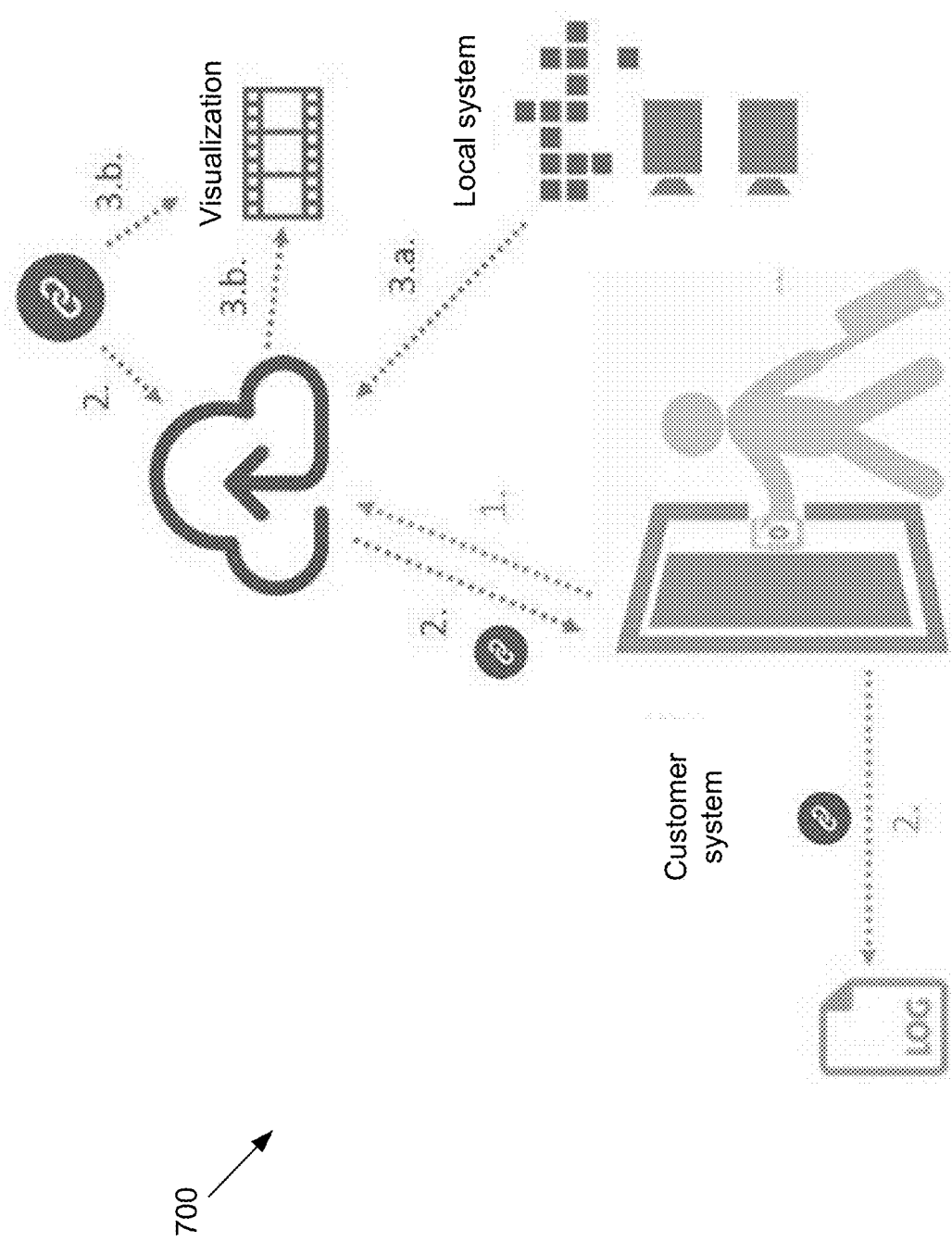
FIGS. 7A and 7B depict block diagrams illustrating example cases where a focalized visualization is queried and created.

FIG. 7A depicts a block diagram 700 illustrating an example case where a focalized visualization is queried and created. This example case solves an event-based visualization problem. In the example of FIG. 7A, each user or customer, who may cross a security door of a building, is offered a mobile application to create a visual evidence of their access of the door. As shown in step 1, the mobile application installed on each user's mobile device detects that an access event has happened at a certain time and at the location of the door and sends a request for a visualization. For example, a Bluetooth Low Energy (BLE) device located at the door acts as a beacon. A mobile application on a user's mobile device is awaken by the BLE beacon when the mobile device is in proximity of the BLE beacon. In some embodiments, the mobile application sends a request for a URL permalink of a location at which the visualization will be placed. In other embodiments, upon accessing the door, the user manually sends the request using the mobile device.

At step 2 of FIG. 7A, the cloud system (e.g., a visualization server 121) creates the permalink and sends it back to the user. The user may choose to add this permalink their access log. The cloud system creates the visualization at step 3. It should be noted that there is no data transmission between the local and the cloud until a user requests the data.

At step 3a, the cloud system pulls video portions best covering the access event from the local index system (based on the time and location). For example, the cloud system identifies a source camera from a set of cameras and retrieve segments from the identified camera around the time that the event occurred. In some embodiments, the local index system may include the computing device 101, the smart capture device 123, the middleware server 109, the segment server 119, the web server 125, the database 143, the persistent storage 145 as shown in FIG. 1. At step 3b, the cloud system generates a video summary that is made accessible through the URL permalink. For example, the cloud system identifies the relevant video segments and assembles the segments to create the visualization. In the trivial case, the cloud system fixes the time stamps to create a video clip that can be shown in a web browser.

Figure 7B:
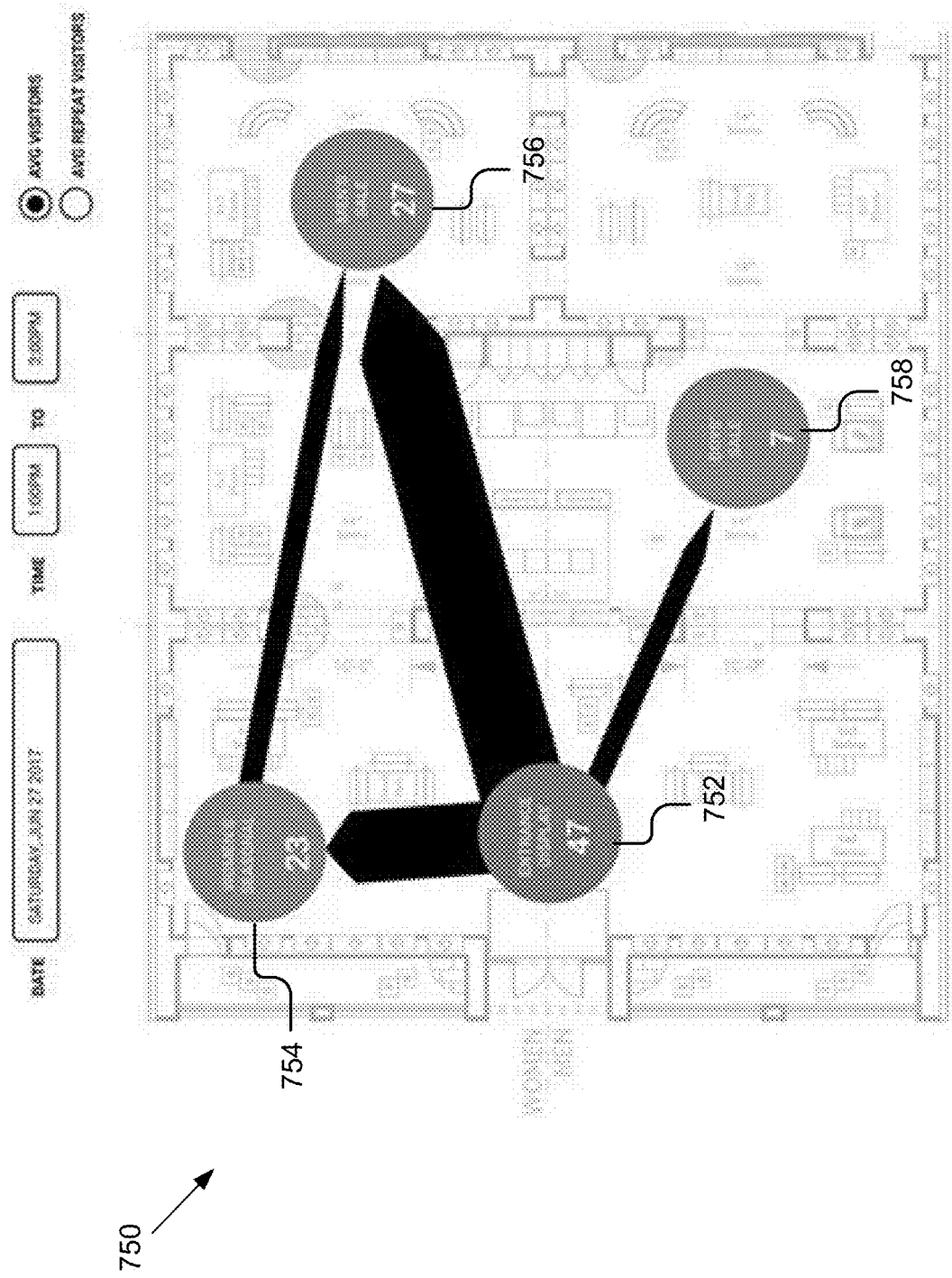

FIG. 7B depicts a block diagram 750 illustrating another example case where a focalized visualization is queried and created. This example case solves a face re-identification problem. Consider a problem of a retailer, who wants a system that alerts the staff whenever a repeat shopper lingers or dwells in front of a display for a promotional product. However, the alert system does not receive a picture of the repeat shopper from a retailer rewards program deemed to such customers, so that the retailer cannot take a picture of a customer and determine whether this customer is a repeat shopper based on facial recognition.

In the example of FIG. 7B, the alert system includes four low-cost cameras installed to monitor the areas of entrance display 752, women's seasonal 754, men's sale 756, and boy's sale 758. The alert system makes an on-the-fly determination of engagement with a display or signage based on images taken at the four areas within a certain time window and determines repeat shoppers by zone based on re-identification measurements. To determine a shopper repeatedly appears in different areas of the store, the alert system identifies the shopper from one image taken at one area and temporally stores the features of this shopper. If features extracted from another image taken at another area of the store match these temporally stored features of this shopper, the alert system re-identifies this shopper from the other image. Neither a database storing enormous amount of data nor a facial data transmission to the cloud is needed in this re-identification procedure. For example, the alert system determines that a first person who appeared in the 47 images taken at the entrance display 752 ten minutes ago also shows up in the 23 images taken at the women's seasonal 754 because features extracted from one of the 47 images match the features extracted from one of the 23 images.

In some embodiments, the alert system further receives video clips from cameras located at the four areas. The alert system decomposes the video clips into segments based on the saliency attributes, for example, the presence of a human, the motion attribute. The alert system performs video analytic on segments of a shopper, e.g., the first person, to determine a time duration that the shopper stays in an area, the activities of the shopper, etc., and determines whether the shopper is a repeat shopper and how to interact with the shopper.

Figure 8:
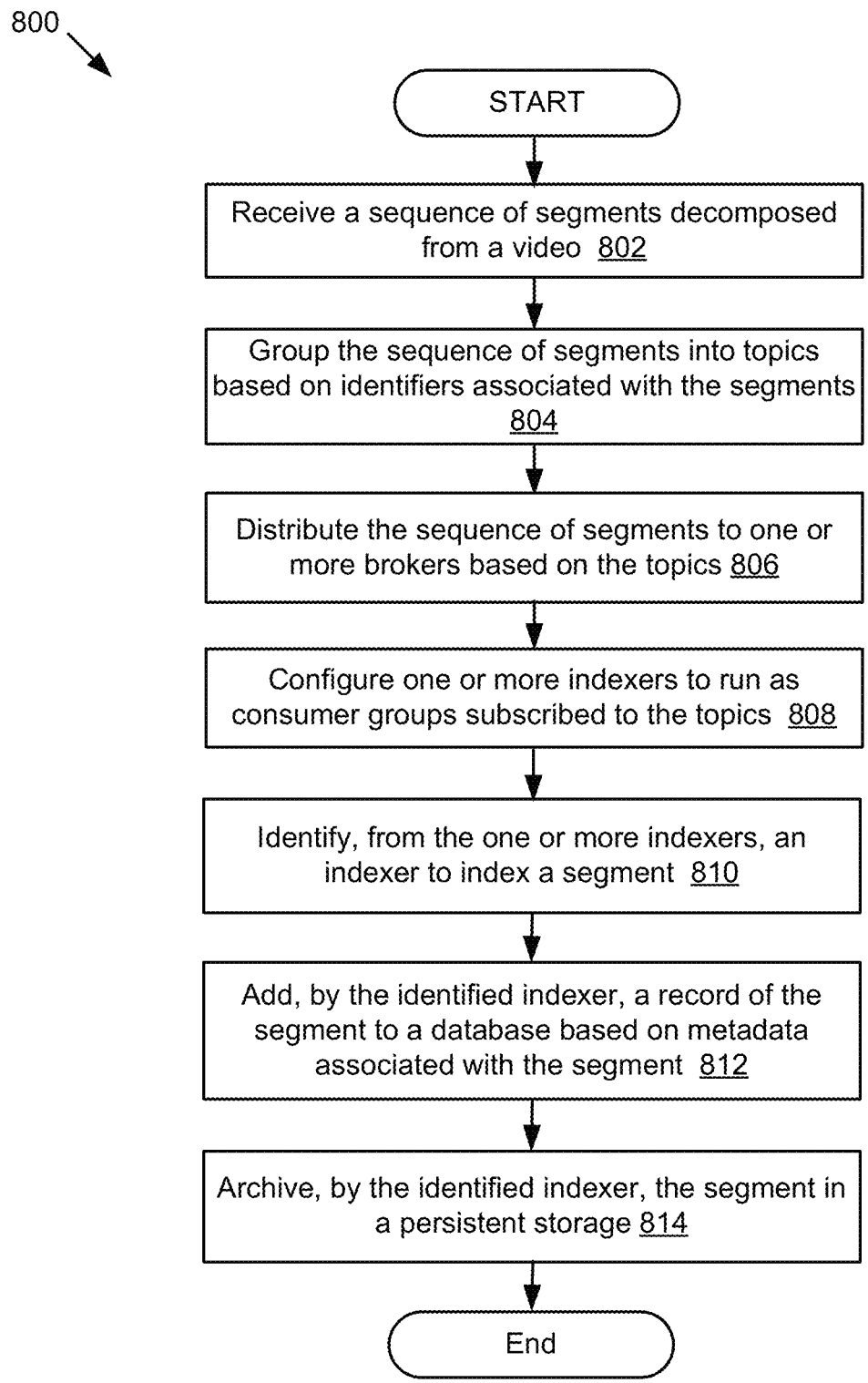
FIG. 8 depicts a flow diagram illustrating one embodiment of a method for analyzing and indexing segments from a video.

FIG. 8 depicts a flow diagram illustrating one embodiment of a method 800 for analyzing and indexing segments from a video. As described above, the middleware server 109 may include a distribution application 131, a broker 133, and a consumer application 135. The distribution application 131 includes a group module 251 and a distribution module 253. At 802, the group module 251 receives a sequence of segments decomposed from a video. At 804, the group module 251 groups the sequence of segments into topics based on identifiers associated with the segments. At 806, the distribution module 253 distributes the sequence of segments to one or more brokers based on the topics. At 808, the consumer application 135 configures one or more indexers to run as consumer groups subscribed to the topics. At 810, the consumer application 135 identifies, from the one or more indexers, an indexer to index a segment. At 812, the identified indexer adds a record of the segment to a database based on metadata associated with the segment. At 814, the identified indexer archives the segment in a persistent storage.

Figure 9:
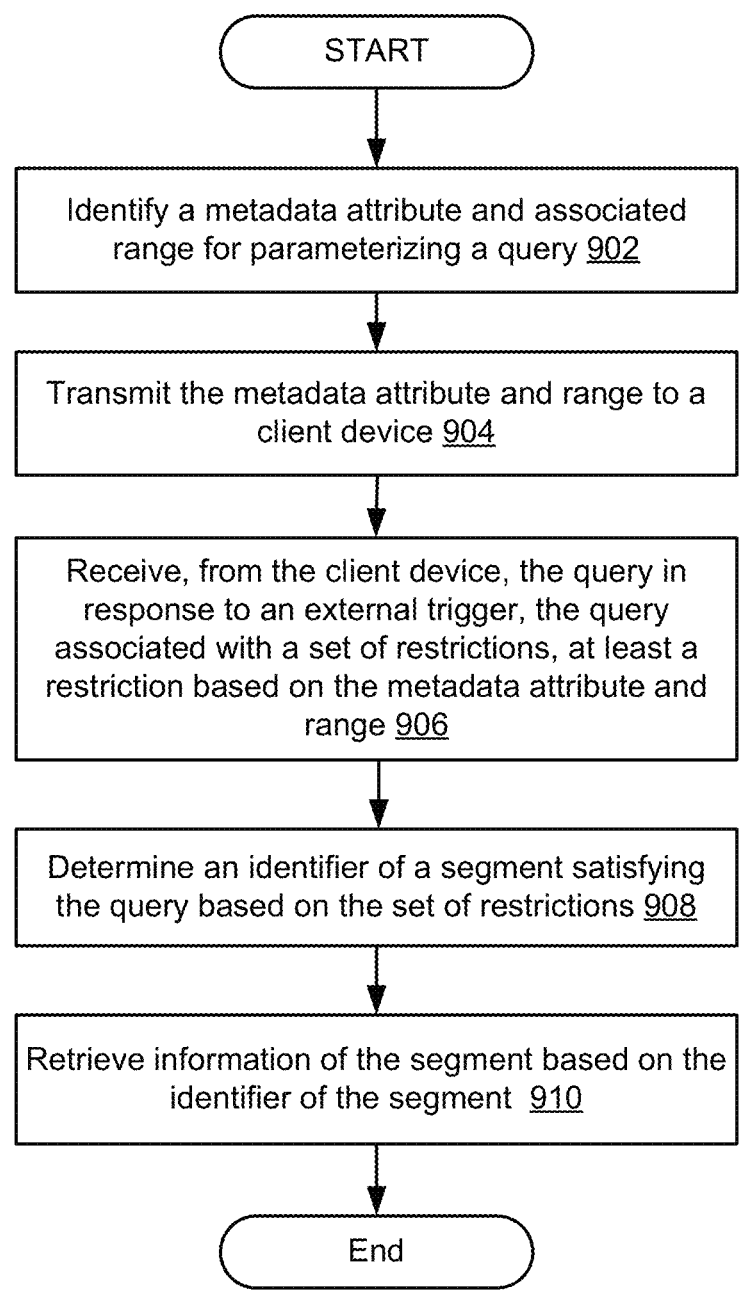
FIG. 9 depicts a flow diagram illustrating embodiments of a method for identifying and retrieving information of a segment from a segment server.

FIG. 9 depicts a flow diagram illustrating one embodiment of a method 900 for identifying and retrieving information of a segment from a segment server, e.g., the segment server 119 as depicted in FIG. 1. At 902, the segment server 119 identifies a metadata attribute and associated range for parameterizing a query. At 904, the segment server 119 transmits the metadata attribute and range to a client device. For example, the client device can be one of a capture device, a smart capture device, a user device, a sensor. At 906, the segment server 119 receives, from the client device, the query in response to an external trigger, the query associated with a set of restrictions, at least a restriction based on the metadata attribute and range. At 908, the segment server 119 determines an identifier of a segment satisfying the query based on the set of restrictions. At 910, the segment server 119 retrieves information of the segment based on the identifier of the segment.

Figure 10:
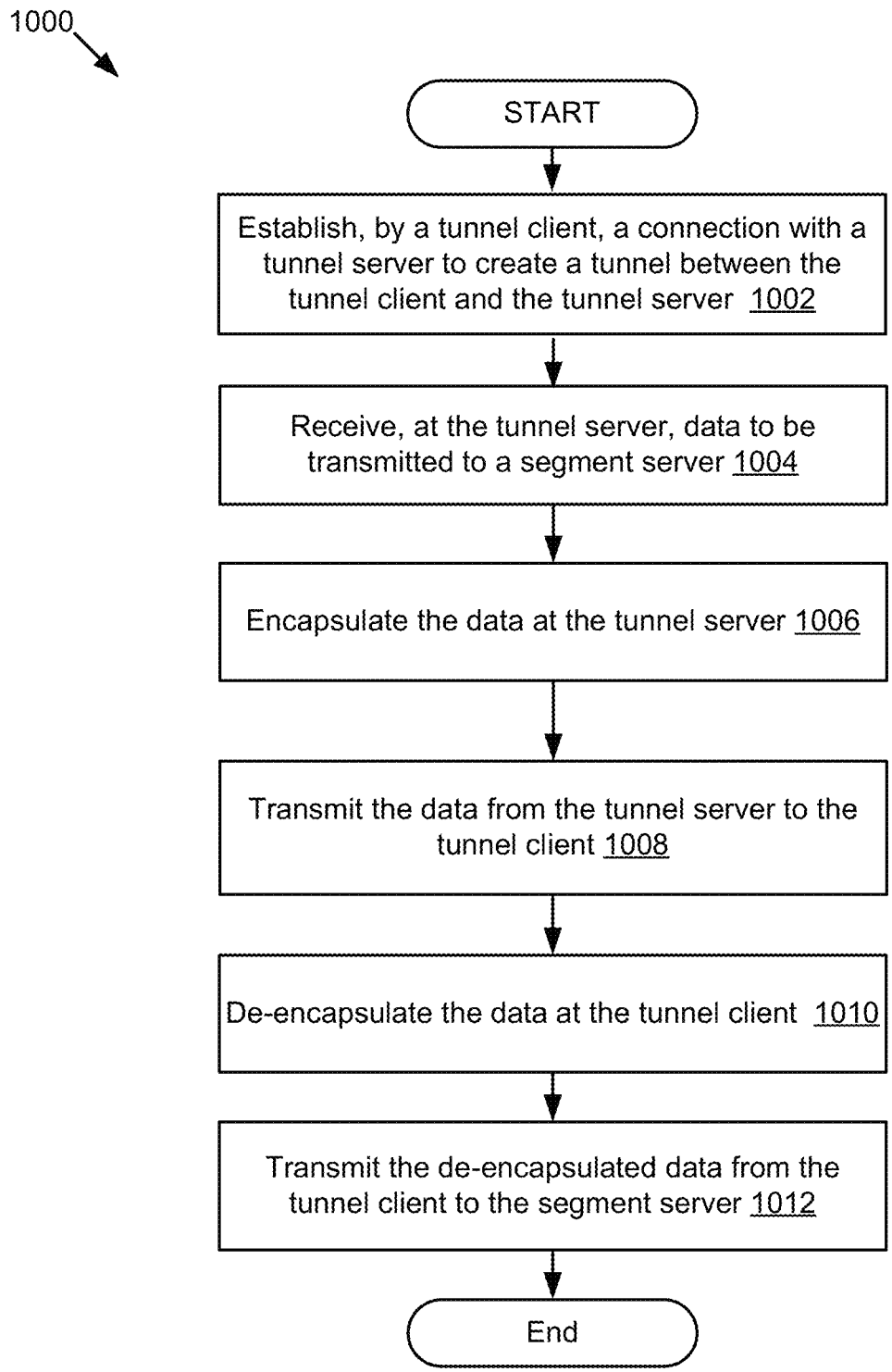
FIG. 10 depicts a flow diagram illustrating embodiments of a method for accessing a segment server using a tunnel from a remote device.

FIG. 10 depicts a flow diagram illustrating embodiments of a method 1000 for accessing a segment server using a tunnel from a remote device. At 1002, a tunnel client establishes a connection with a tunnel server to create a tunnel between the tunnel client and the tunnel server. At 1004, the tunnel server receives data to be transmitted to a segment server from the remote device. At 1006, the tunnel server encapsulates the data. At 1008, the tunnel server transmits the data to the tunnel client. At 1010, the tunnel client de-encapsulates the data. At 1012, the tunnel client transmits the de-encapsulated data to the segment server.

Figure 11:
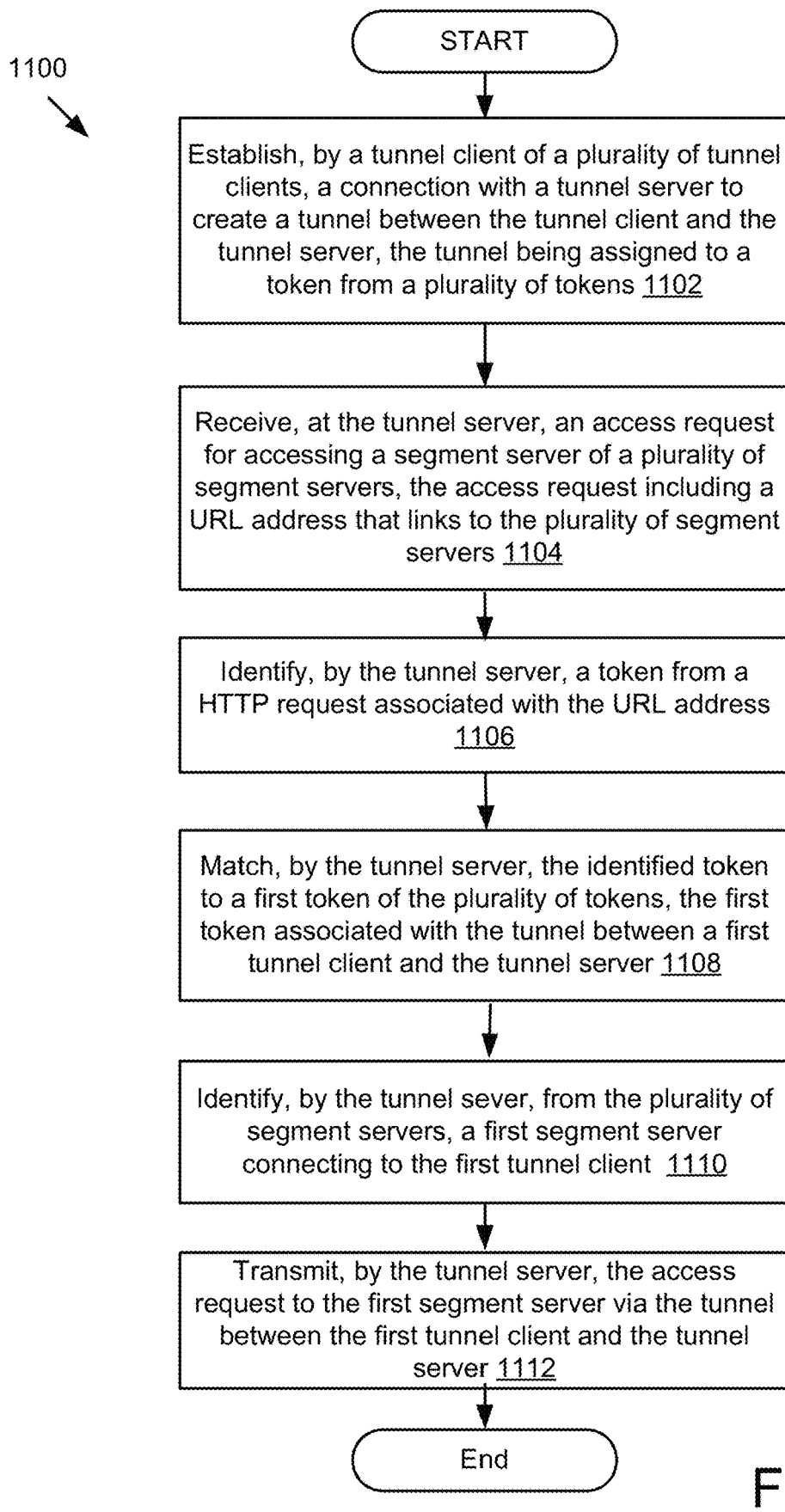
FIG. 11 depicts a flow diagram illustrating embodiments of a method for identifying and accessing a segment server of a plurality of segment servers from a remote device.

FIG. 11 depicts a flow diagram illustrating embodiments of a method 1100 for identifying and accessing a segment server of a plurality of segment servers from a remote device. At 1102, a tunnel client of a plurality of tunnel clients establishes a connection with a tunnel server to create a tunnel between the tunnel client and the tunnel server, the tunnel being assigned to a token from a plurality of tokens. At 1104, the tunnel server receives an access request for accessing a segment server of a plurality of segment servers, the access request including a URL address that links to the plurality of segment servers.

At 1106, the tunnel server identifies a token from an HTTP request associated with the URL address. At 1108, the tunnel server matches the identified token to a first token of the plurality of tokens, the first token associated with the tunnel between a first tunnel client and the tunnel server. At 1110, the tunnel server identifies, from the plurality of segment servers, a first segment server connecting to the first tunnel client. At 1112, the tunnel server transmits the access request to the first segment server via the tunnel between the first tunnel client and the tunnel server.

Figure 12:
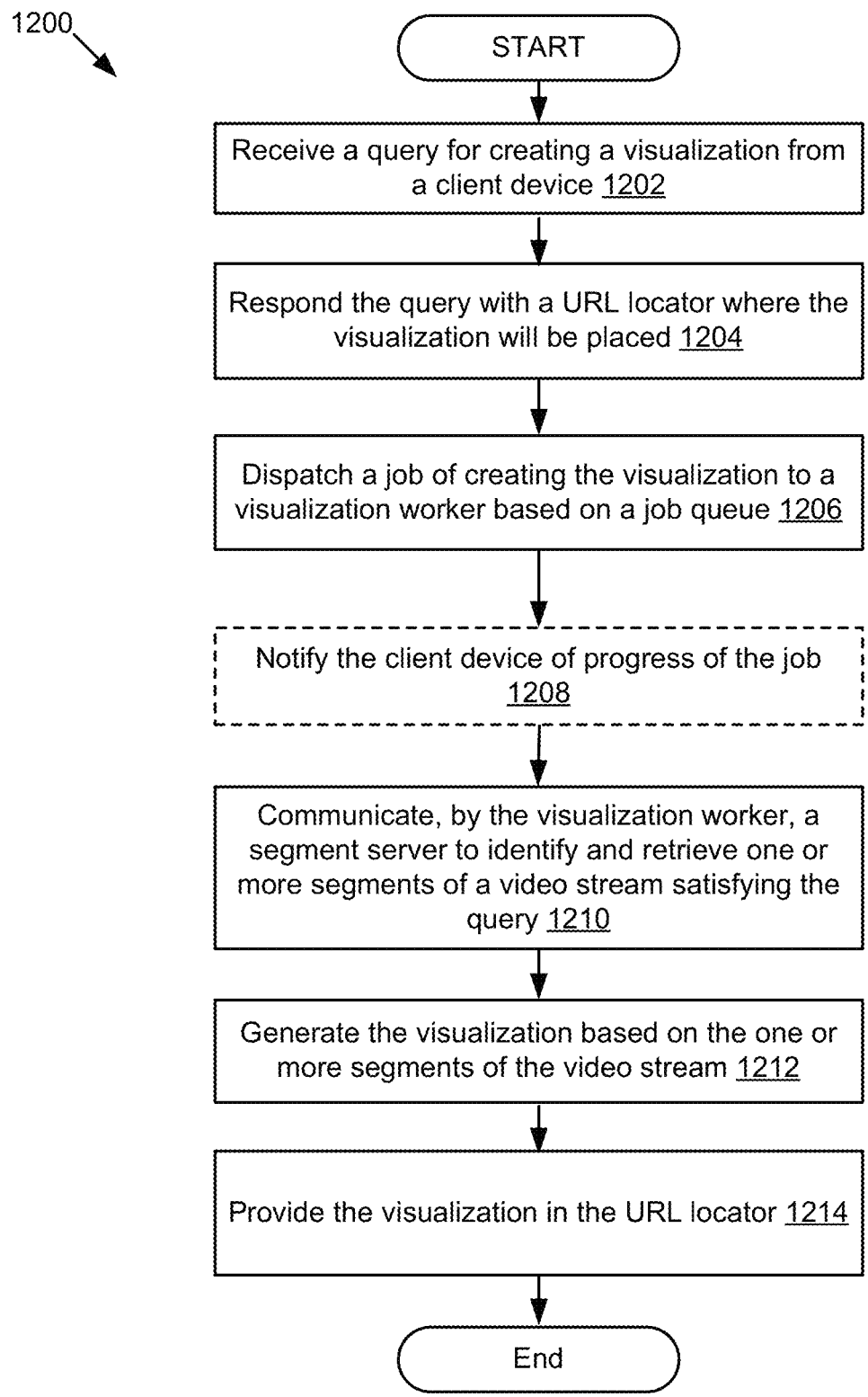
FIG. 12 depicts a flow diagram illustrating embodiments of a method for providing a visualization based on a query.

FIG. 12 depicts a flow diagram illustrating embodiments of a method 1200 for providing a visualization based on a query. At 1202, a visualization server 121 receives a query for creating a visualization from a client device. For example, the client device can be one of a capture device, a smart capture device, a user device, a sensor. At 1204, the visualization server 121 responds the query with a URL locator where the visualization will be placed. At 1206, visualization server 121 dispatch a job of creating the visualization to a visualization worker based on a job queue. A visualization worker is a subsystem capable of generating visualizations. At 1208, the visualization server 121 notifies the client device of progress of the job. The dashed line indicates that step 1208 is optional. At 1210, the visualization worker communicates with a segment server to identify and retrieve one or more segments of a video stream satisfying the query. At 1212, the visualization worker generates the visualization based on the one or more segments of the video stream. The visualization creation job completes. At 1214, the visualization server 121 provides the visualization in the URL locator.

A system and method for creating, storing, and retrieving a focalized visualization related to a location, an event or a subject of interest has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    extracting a plurality of salient fragments of a video, each salient fragment including one or more segments of the video, each segment being associated with segment metadata, the segment metadata including relationship information between segments based on a cause-and-effect relationship;
    building a database of the plurality of salient fragments, the database storing records of each segment of the video, each record including a location at which a respective segment is stored and the associated segment metadata;
    indexing the segments of the video in the database based on the cause-and-effect relationship information in the segment metadata, wherein the cause-and-effect relationship information relates a first segment to a second segment in response to an object or an action in the first segment having a cause-and-effect relationship with an object or an action in the second segment;
    receiving a query for creating a visualization from a client device, wherein the query is generated in response to a trigger event from an external system and the query includes a set of restrictions related to the trigger event; and
    responsive to the query, performing a visualization creation job by:
        generating a URL to show a state of the visualization creation job;
        identifying related salient fragments of the video from the database that are related by the cause-and-effect relationship between the segments based on the set of restrictions;
        retrieving one or more identified salient fragments that satisfy the set of restrictions included in the query;
        generating the visualization based on the one or more salient fragments of the video; and
        providing the generated visualization at the URL as a result of the visualization creation job.

2. The computer-implemented method of claim 1, wherein the set of restrictions includes a motion threshold.

3. The computer-implemented method of claim 1, further comprising:
    receiving, by an application server, the trigger event from the client device; and
    converting, by the application server, the trigger event to the query for the visualization.

4. The computer-implemented method of claim 3, wherein converting, by the application server, the trigger event to the query for the visualization further comprises specifying the set of restrictions related to the trigger event for the query, and wherein the set of restrictions includes at least one of a temporal parameter, a spatial parameter, and a saliency attribute.

5. The computer-implemented method of claim 1, further comprising:
    dispatching the visualization creation job of creating the visualization to a visualization worker based on a job queue; and
    communicating a request, by the visualization worker, to a segment server to identify the related salient fragments of the video from the database and retrieve the one or more identified salient fragments that satisfy the set of restrictions included in the query.

6. The computer-implemented method of claim 1, wherein each salient fragment includes a subset of frames and a subset of pixels from the subset of frames.

7. The computer-implemented method of claim 6, further comprising:
    grouping, by a middleware server, the one or more segments into topics based on identifiers associated with each segment of the one or more segments;
    configuring, by the middleware server, one or more indexers to run as consumer groups subscribed to the topics;
    identifying, by the middleware server, from the one or more indexers, an indexer to store a segment;
    adding, by the indexer, the record of the segment to the database based on the associated segment metadata; and
    archiving, by the indexer, the segment in a persistent storage.

8. The computer-implemented method of claim 1, wherein retrieving the one or more identified salient fragments that satisfy the set of restrictions included in the query comprises establishing a tunnel to communicate with a segment server to retrieve the one or more identified salient fragments.

9. A system comprising:
    one or more processors; and
    a memory, the memory storing instructions, which when executed cause the one or more processors to:
        extract a plurality of salient fragments of a video, each salient fragment including one or more segments of the video, each segment being associated with segment metadata, the segment metadata including relationship information between segments based on a cause-and-effect relationship;

build a database of the plurality of salient fragments, the database storing records of each segment of the video, each record including a location at which a respective segment is stored and the associated segment metadata;

index the segments of the video in the database based on the cause-and-effect relationship information in the segment metadata, wherein the cause-and-effect relationship information relates a first segment to a second segment in response to an object or an action in the first segment having a cause-and-effect relationship with an object or an action in the second segment;

receive a query creating a visualization from a client device, wherein the query is generated in response to a trigger event from an external system and the query includes a set of restrictions related to the trigger event; and responsive to the query, perform a visualization creation job by:
  generating a URL to show a state of the visualization creation job;
  identifying related salient fragments of the video from the database that are related by the cause-and-effect relationship between the segments based on the set of restrictions;
  retrieving one or more identified salient fragments that satisfy the set of restrictions included in the query;
  generating the visualization based on the one or more salient fragments of the video; and
  providing the generated visualization at the URL as a result of the visualization creation job.

10. The system of claim 9, wherein the set of restrictions includes a motion threshold.

11. The system of claim 9, wherein the instructions further cause the one or more processors to:
  receive the trigger event from the client device; and
  convert the trigger event to the query for the visualization.

12. The system of claim 11, wherein to convert, by the application server, the trigger event to the query for the visualization, the instructions further cause the one or more processors to:
  specify the set of restrictions related to the trigger event for the query; and
  wherein the set of restrictions includes at least one of a temporal parameter, a spatial parameter, and a saliency attribute.

13. The system of claim 9, wherein the instructions cause the one or more processors to:
  dispatch the visualization creation job of creating the visualization to a visualization worker based on a job queue; and
  communicate a request, by the visualization worker, to a segment server to identify the related salient fragments of the video from the database and retrieve the one or more identified salient fragments that satisfy the set of restrictions included in the query.

14. The system of claim 9, wherein each salient fragment includes a subset of frames and a subset of pixels from the subset of frames.

15. The system of claim 14, wherein the instructions cause the one or more processors to:
  group the one or more segments into topics based on identifiers associated with each segment of the one or more segments;
  configure one or more indexers to run as consumer groups subscribed to the topics;
  identify from the one or more indexers, an indexer to store a segment;
  add, by the indexer, the record of the segment to the database based on the associated segment metadata; and
  archive, by the indexer, the segment in a persistent storage.

16. A computer program product comprising a non-transitory computer readable medium storing a computer readable program, wherein the computer readable program when executed causes a computer to:
  extract a plurality of salient fragments of a video, each salient fragment including one or more segments of the video, each segment being associated with segment metadata, the segment metadata including relationship information between segments based on a cause-and-effect relationship;
  build a database of the plurality of salient fragments, the database storing records of each segment of the video, each record including a location at which a respective segment is stored and the associated segment metadata;
  index the segments of the video in the database based on the cause-and-effect relationship information in the segment metadata, wherein the cause-and-effect relationship information relates a first segment to a second segment in response to an object or an action in the first segment having a cause-and-effect relationship with an object or an action in the second segment;
  receive a query for creating a visualization focalized on a first object from a client device, wherein the query is generated in response to a trigger event from an external system and the query includes a set of restrictions related to the trigger event; and
  responsive to the query, perform a visualization creation job by:
    generating a URL to show a state of the visualization creation job;
    identifying related salient fragments of the video from the database that are related by the cause-and-effect relationship between the segments based on the set of restrictions;
    retrieving one or more identified salient fragments that satisfy the set of restrictions included in the query;
    generating the visualization based on the one or more salient fragments of the video; and
    providing the generated visualization at the URL as a result of the visualization creation job.

17. The computer program product of claim 16, wherein the set of restrictions includes a motion threshold.

18. The computer program product of claim 16, wherein the computer readable program causes the computer to:
  receive the trigger event from the client device; and
  convert the trigger event to the query for the visualization.

19. The computer program product of claim 18, wherein to convert the trigger event to the query for the visualization, the computer readable program causes the computer to:
  specify the set of restrictions related to the trigger event for the query; and
  wherein the set of restrictions includes at least one of a temporal parameter, a spatial parameter, and a saliency attribute.

20. The computer program product of claim 16, wherein the computer readable program causes the computer to:
- dispatch the visualization creation job of creating the visualization to a visualization worker based on a job queue; and
- communicate a request, by the visualization worker, to identify the related salient fragments of the video from the database and retrieve the one or more identified salient fragments that satisfy the set of restrictions included in the query.

* * * * *